US012365799B2

(12) United States Patent
Zhang et al.

(10) Patent No.: US 12,365,799 B2
(45) Date of Patent: Jul. 22, 2025

(54) OIL-BLEED SELF-BONDING LIQUID SILICONE RUBBER COMPOSITION

(71) Applicant: MOMENTIVE PERFORMANCE MATERIALS INC., Waterford, NY (US)

(72) Inventors: Huiping Zhang, Clifton Park, NY (US); Clemens Trumm, Sankt Augustin (DE); Gunnar Hoffmueller, Odenthal (DE); John Mitchell Huggins, Leverkusen (DE); Hubertus Eversheim, Wermelskirchen (DE); Srividhya Marimuthu, Bangalore (IN); Enise Michalski, Langenfeld (DE)

(73) Assignee: MOMENTIVE PERFORMANCE MATERIALS INC., Niskayuna, NY (US)

( * ) Notice: Subject to any disclaimer, the term of this patent is extended or adjusted under 35 U.S.C. 154(b) by 1102 days.

(21) Appl. No.: 17/056,520

(22) PCT Filed: May 23, 2019

(86) PCT No.: PCT/US2019/033646
§ 371 (c)(1),
(2) Date: Nov. 18, 2020

(87) PCT Pub. No.: WO2019/226842
PCT Pub. Date: Nov. 28, 2019

(65) Prior Publication Data
US 2021/0261778 A1     Aug. 26, 2021

(30) Foreign Application Priority Data

May 24, 2018 (EP) ..................... 18174095

(51) Int. Cl.
*C08L 83/04* (2006.01)
*C08G 77/12* (2006.01)
(Continued)

(52) U.S. Cl.
CPC ............ *C08L 83/04* (2013.01); *C09D 183/04* (2013.01); *C09J 183/04* (2013.01); *C08G 77/12* (2013.01); *C08G 77/80* (2013.01)

(58) Field of Classification Search
CPC ............ C08G 77/04–398; C08G 77/20; C09D 183/04–14; C08L 83/04–14;
(Continued)

(56) References Cited

U.S. PATENT DOCUMENTS 3,159,601 A   12/1964 Ashby
3,159,662 A   12/1964 Ashby
(Continued)

FOREIGN PATENT DOCUMENTS

EP   122008    10/1984
EP   0686671   12/1995
(Continued)

OTHER PUBLICATIONS

Patent Cooperation Treaty (PCT), International Search Report and Written Opinion for Application PCT/US2019/033646 filed May 23, 2019, mailed Aug. 19, 2019, International Searching Authority, EP.

*Primary Examiner* — Michael C Romanowski
(74) *Attorney, Agent, or Firm* — Joseph Waters; McDonald Hopkins LLC

(57) ABSTRACT

The present invention relates to an oil-bleed self-bonding liquid silicone rubber composition having both self-bonding and self-lubricating capabilities. The oil-bleed self-bonding liquid silicone rubber composition exhibits self-bonding capability in particular to substrates that contain residual (Continued)

hydroxyl groups or other residual hydrosilyl-reacting groups on their surface, including polycarbonate, polyester, polyamide, polysulfone, polyurethane, phenolic resin, epoxy resin, cellulose, glass and the mixture thereof.

15 Claims, 1 Drawing Sheet

(51) Int. Cl.
   *C09D 183/04* (2006.01)
   *C09J 183/04* (2006.01)
   *C08G 77/00* (2006.01)

(58) Field of Classification Search
   CPC ..... C08L 51/085; C08L 83/00; C08J 2383/12; C08J 2383/14; C08J 2383/04; C08J 2383/05; C08J 2383/06; C08J 2383/07; C08K 5/54; C08K 3/36; C08K 5/06; C08K 5/5415; C08K 5/56
   See application file for complete search history.

(56) References Cited

U.S. PATENT DOCUMENTS

| | | | |
|---|---|---|---|
| 3,419,593 A | 12/1968 | Willing | |
| 3,715,334 A | 2/1973 | Kartstedt | |
| 3,775,452 A | 11/1973 | Kartstedt | |
| 3,814,730 A | 6/1974 | Kartstedt | |
| 4,510,094 A | 4/1985 | Drahnak | |
| 4,530,879 A | 7/1985 | Drahnak | |
| 4,640,939 A | 2/1987 | Cavezzan et al. | |
| 5,164,461 A * | 11/1992 | Mitchell | C08K 5/5425 528/33 |
| 5,583,178 A * | 12/1996 | Oxman | A61K 6/20 524/718 |
| 5,879,809 A | 3/1999 | Muramatsu et al. | |
| 5,989,704 A * | 11/1999 | Hashimoto | H01R 43/18 428/412 |
| 6,004,679 A * | 12/1999 | Mitchell | H05K 3/386 524/588 |
| 6,022,921 A * | 2/2000 | Achenbach | C08L 83/04 524/588 |
| 6,046,294 A * | 4/2000 | Achenbach | C09D 183/04 528/31 |
| 6,232,379 B1 | 5/2001 | Takita | |
| 6,323,262 B1 * | 11/2001 | Achenbach | C08J 3/201 528/214 |
| 6,645,637 B2 | 11/2003 | Kaltenborn et al. | |
| 6,780,518 B2 | 8/2004 | Azechi et al. | |
| 6,887,932 B2 | 5/2005 | Azechi et al. | |
| 7,273,911 B2 | 9/2007 | Fehn | |
| 8,916,646 B2 | 2/2014 | Kato | |
| 11,306,205 B2 * | 4/2022 | Zhang | C09D 183/04 |
| 2002/0032270 A1 * | 3/2002 | Azechi | C08L 83/00 524/492 |
| 2002/0132891 A1 * | 9/2002 | Azechi | C09J 183/04 524/492 |
| 2003/0019960 A1 | 1/2003 | Magel | |
| 2003/0236380 A1 * | 12/2003 | Fehn | C09J 183/04 528/12 |
| 2004/0266923 A1 * | 12/2004 | Fehn | C09J 183/04 524/261 |
| 2005/0042462 A1 * | 2/2005 | Fehn | C09J 183/04 428/447 |
| 2006/0188733 A1 * | 8/2006 | Achenbach | C08L 83/04 524/588 |
| 2007/0238803 A1 * | 10/2007 | Bissinger | A61K 6/896 433/226 |
| 2010/0069531 A1 * | 3/2010 | Sakamoto | C08L 83/04 524/265 |
| 2010/0184881 A1 * | 7/2010 | Zech | A61K 6/90 523/109 |
| 2010/0210794 A1 * | 8/2010 | Frese | C08L 83/04 525/478 |
| 2011/0237702 A1 * | 9/2011 | Ide | C08L 63/00 522/135 |
| 2012/0232219 A1 * | 9/2012 | Kato | C08L 83/04 528/31 |
| 2014/0051806 A1 * | 2/2014 | Kato | C08L 83/00 524/866 |
| 2014/0179863 A1 * | 6/2014 | Kato | C08L 83/04 524/588 |
| 2015/0008455 A1 * | 1/2015 | Tozawa | B29C 45/372 264/272.14 |
| 2017/0081515 A1 * | 3/2017 | Kato | C08K 9/06 |
| 2018/0134871 A1 * | 5/2018 | Kato | C08L 83/04 |
| 2020/0048508 A1 * | 2/2020 | Onozawa | C09K 3/00 |
| 2021/0002526 A1 * | 1/2021 | Wang et al. | C09J 151/085 |
| 2021/0163688 A1 * | 6/2021 | Endo | C08K 7/18 |
| 2021/0214504 A1 * | 7/2021 | Hoffmann | C08G 75/045 |

FOREIGN PATENT DOCUMENTS

| | | | |
|---|---|---|---|
| EP | 1672031 | 6/2006 | |
| EP | 2474573 A1 * | 7/2012 | ............ C08L 83/04 |
| WO | 2011107592 | 9/2011 | |

* cited by examiner

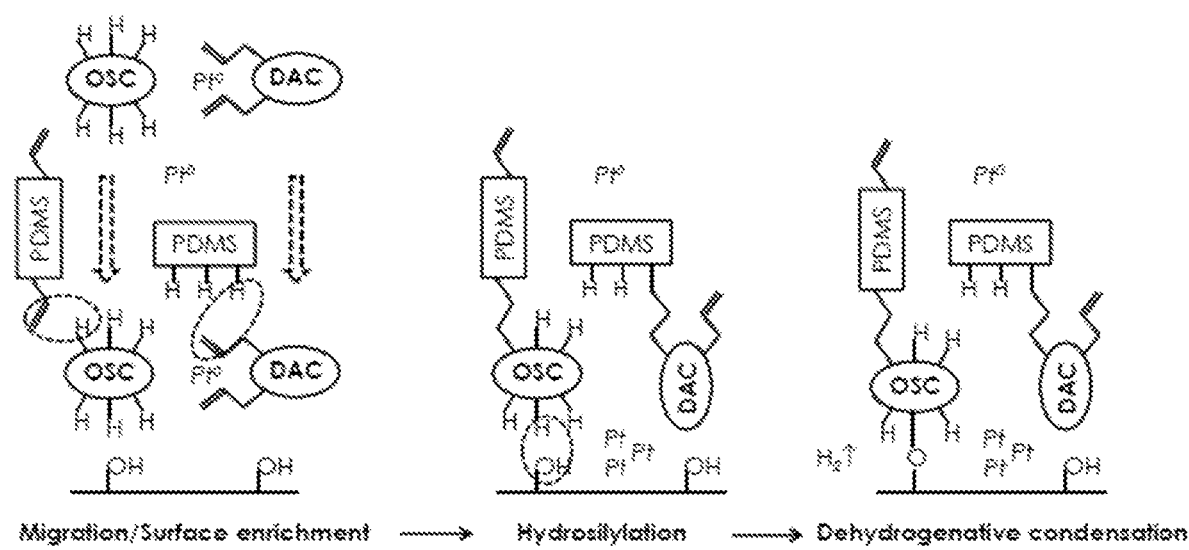

OIL-BLEED SELF-BONDING LIQUID SILICONE RUBBER COMPOSITION

CROSS REFERENCE TO RELATED APPLICATIONS

The present application is a 35 U.S.C. 371 national stage filing of PCT Application No. PCT/US2019/033646 filed May 23, 2019, which claims priority to European Application No. 18174095.2 filed on May 24, 2018, the disclosure of which are incorporated herein by reference in their entireties.

The present invention relates to an oil-bleed self-bonding liquid silicone rubber composition, which, in particular, has self-bonding capability. The oil-bleed self-bonding liquid silicone rubber composition according to the invention (in the following sometimes referred to as liquid silicone rubber composition (LSR)) exhibits self-bonding capability to various thermoplastic substrates. Bonding addition-cured LSR to thermoplastics usually requires the application of a primer on substrate surface. The new self-bonding oil-bleed LSR composition according to the invention provides a primerless solution, eliminating the need for a separate secondary operation process and enabling direct two-shot or multiple-shot over-molding process. There have been a number of publications in recent years addressing different methods of bonding addition-cured LSR to thermoplastics without the use of primers. Most of these approaches involve the use of an organosilicon compound (OSC) containing at least one phenylene group and at least one hydrosilyl (SiH) group in the self-bonding LSR composition. For example, a representative OSC (OSC-1) is shown below:

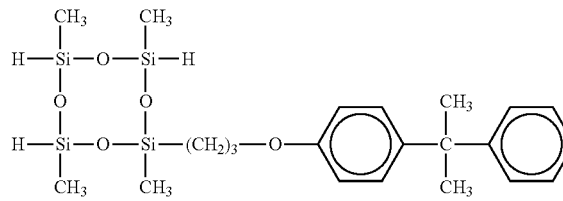
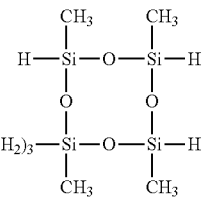

Adding OSC alone to a typical addition-cured LSR formulation, however, is not sufficient to generate robust bonding performance. Additional ingredients are usually needed in the LSR composition to provide firm adhesion to thermoplastics while maintaining good release from metals, allowing a smooth two-shot injection molding process to produce integrated silicone/thermoplastic articles. A third functionality in addition to phenylene and SiH can also be incorporated in the OSC molecule to improve LSR's bonding performance. U.S. Pat. No. 6,780,518 (US2002132891A1) discloses the use of epoxy functionalized OSC as the adhesion agent in LSR. U.S. Pat. No. 6,645,638 (US2002028335A1) employs a selective group of ester compounds along with OSC in its self-bonding LSR composition. U.S. Pat. No. 6,887,932 (US2002032270A1) utilizes a functional siloxane polymer together with OSC in the LSR composition. The claimed functional siloxane polymer is immiscible with LSR and can react with the silicone material in LSR through hydrosilylation. U.S. Pat. No. 8,916,646 uses the combination of bi-functional organohydrogenpolysiloxane and OSC in LSR. In the absence of this bi-functional polymer, the adhesion property suffers. U.S. Pat. No. 7,273,911 relates to an addition-crosslinking silicone composition comprising at least two adhesion promoters. U.S. Pat. Nos. 5,989,704 and 5,879,809 disclose the inclusion of a thermoplastic oligomer containing at least one aliphatic unsaturated group in thermoplastic resin composition.

Implementing self-lubrication or oil-bleed functionality into self-bonding silicone rubber can negatively impact its adhesion performance as bleeding additives in silicone rubber could destroy the adhesion between silicone and thermoplastic substrates, in particular, polycarbonate (PC) and polybutylene terephthalate (PBT).

This invention surprisingly unveils the synergy among an alkyl-group-containing silicone oil, an organosilicon compound containing at least one polyvalent aromatic group (OSC), and an aromatic compound with at least two unsaturated hydrocarbyl groups, which aromatic compound does not contain a siloxane group, in particular, diallyl compounds (DAC) that enable the silicone rubber composition to not only possess time-lapse oil bleed property after vulcanization but also adhere to any substrate that contains residual functional groups on its surface that can react with SiH, in particular, hydroxyl groups, during multicomponent molding processes. The said substrate includes, for example, PC, PBT, polyester, polyurethane, poly(phenylene oxide), polysulfone, poly(vinyl alcohol), phenolic resin, epoxy resin, cellulose, glass, polyamide and polyetherimide. The combination of OSC and DAC provides strong bonding between silicone rubber and the substrate even at relatively high temperatures, such as 120° C., to avoid possible delamination issues during the molding processes. The alkyl-group-containing silicone oil, on the other hand, can migrate to the surface over time due to its immiscibility with vulcanized silicone rubber to generate a thin layer of oil on rubber surface, providing lubricity. The time-lapse oil bleed avoids contamination to the mold and thereby reduces mold-fouling issues. Its interference to the bonding is also negligible.

FIG. 1 is a representation of a proposal bonding mechanism between liquid silicone rubber (LSR) and a substrate.

In accordance with the present invention there is provided an oil-bleed self-bonding liquid silicone rubber composition, comprising:

(A) at least one polyorganosiloxane having at least two unsaturated hydrocarbyl residues, (B) at least one polyorganohydrogensiloxane, (C) at least one hydrosilylation catalyst, comprising a transition metal, (D) at least one organosilicon compound containing at least one polyvalent aromatic group, which is not directly attached to a silicon atom, and at least one Si—H group, different from compound B), (E) at least one aromatic compound with at least two unsaturated hydrocarbyl residues, which does not contain a siloxane group, (F) at least one silicone oil having at least one alkyl group having at least two carbon atoms, (G) optionally one or more filler, and (H) optionally one or more auxiliary additives.

In the following the oil-bleed self-bonding liquid silicone rubber composition according to the invention is referred to simply as "addition-curable silicone rubber composition".

In a preferred embodiment of the addition-curable silicone rubber composition according to the invention, component (A) is selected from one or more polyorganosiloxanes of the general formula (1):

$$[M_a D_b T_c Q_d Z_e]_m \quad (1)$$

wherein
a=0-10
b=0-2000
c=0-50
d=0-10
e=0-300
m=1-1000, with
a+b+c+d+e≥2, and
$M=R_3SiO_{1/2}$, or M*
$D=R_2SiO_{2/2}$, or D*
$T=RSiO_{3/2}$, or T*
$Q=SiO_{4/2}$, Z is a divalent optionally substituted hydrocarbyl bridging group with up to 14 carbon atoms between two siloxy groups as defined before, wherein R is selected from optionally substituted hydrocarbyl groups with up to 30 carbon atoms and poly($C_2$-$C_4$)-alkylene ether groups with up to 1000 alkylene oxy units, the groups R being free of aliphatic unsaturation, and wherein $M^*=R^1_p R_{3-p} SiO_{1/2}$,
$D^*=R^1_q R_{2-q} SiO_{2/2}$,
$T^*=R^1 SiO_{3/2}$, wherein
p=1-3,
q=1-2, and
$R^1$ is selected from unsaturated optionally substituted hydrocarbyl groups with up to 30 carbon atoms, with the proviso that there are at least two groups selected from M*, D* and T*.

In a preferred embodiment of the addition-curable silicone rubber composition according to the invention component (B) is selected from one or more polyorganohydrogensiloxanes of the general formula (2):

$$[M^1_{a2} D^1_{b2} T^1_{c2} Q_{d2} Z_{e2}]_{m2} \quad (2)$$

wherein the siloxy units
$M^1$=M, as defined above, or M**,
$D^1$=D, as defined above, or D**,
$T^1$=T, as defined above, or T**,
Q as defined above,
Z as defined above,
$M^{}=HR_2SiO_{1/2}$, $D^{}=HRSiO_{2/2}$, $T^{**}=HSiO_{3/2}$,
a2=0.01-10 preferably =2-5, most preferably =2
b2=0-1000 preferably =10-500
c2=0-50 preferably =0
d2=0-5 preferably =0
e2=0-3 preferably =0
m2=1-1000, preferably =1-500, most preferably =1,
with the proviso that there are at least two groups selected from M, D and T**.

In a preferred embodiment of the addition-curable silicone rubber composition according to invention component (C) is selected from hydrosilylation catalysts comprising platinum.

Component (D) is at least one organosilicon compound containing at least one polyvalent aromatic group, which is not directly attached to a silicon atom, and at least one Si—H group, different from compound (B). The term "which is not directly attached to a silicon atom" is intended to mean that there is no bond of a Si atom to a carbon atom being part of a polyvalent aromatic group, in particular, there is no Si-phenylene-Si group.

In a preferred embodiment of the addition-curable silicone rubber composition according to the invention component (D) is an organosilicon compound comprising one or more straight-chain or cyclic optionally substituted organosiloxane moieties containing 1 to 30 silicon atoms, at least one SiH group, and at least one polyvalent aromatic group, which is not directly attached to a silicon atom.

The at least one aromatic compound (E) is an aromatic compound that has at least two, preferably two, three or four, more preferably two unsaturated hydrocarbyl groups, preferably allyl groups. The aromatic compound (E) does not contain a siloxane group, that is, it does not comprise a Si—O—Si moiety. The unsaturated hydrocarbyl group is in particular an unsaturated aliphatic group having preferably up to 6 carbon atoms and optionally one or more heteroatoms. Most preferably the unsaturated hydrocarbyl group comprises an allyl group, which for example can be attached to the aromatic group via a carbon atom, an oxygen atom (—O—) or an ester group (—C(O)—O— or —O—C(O)—). The aromatic compound (E) comprises at least one aromatic group, preferably having 6 to 10 carbon atoms, most preferably at least one or two phenyl moieties (which may be linked by a linker group or which may be also present as a biphenyl group). The aromatic group(s) in the aromatic compound (E) optionally may have additional, preferably 1 or 2 substituents apart from the unsaturated hydrocarbyl group. Such additional substituents may be selected for example from hydroxyl, halogen, C1-C6-alkyl, C1-C6-alkoxy, C1-C6-alkylcarbonyloxy, C1-C6-alkyloxycarbonyl and tri(C1-C6-hydrocarbyl)siloxy.

In a particular preferred embodiment of the addition-curable silicone rubber composition according to the invention the aromatic compound (E) is a compound which comprises at least two, three or four allyl groups, preferably two allyl groups. Particularly preferred is a diallyl compound (E) which is selected from the group consisting of an aromatic compound of the formula (3):

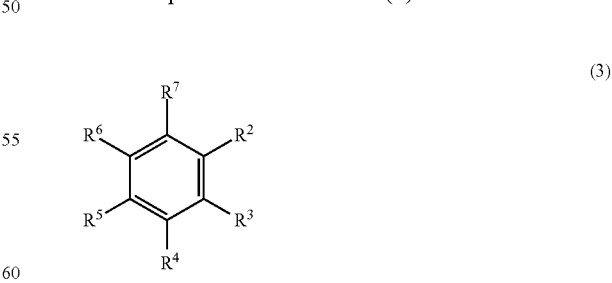

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 6 carbon atoms, —O—$R^9$, wherein $R^9$ is a saturated or unsaturated optionally substituted hydrocarbyl group with up to 6 carbon atoms, —C(O)—O—$R^{10}$, wherein $R^{10}$ is a saturated or unsaturated optionally substituted hydrocarbyl group with up to 6 carbon atoms, and —O—C(O)—$R^{10}$, wherein $R^{10}$ is as defined before, with the proviso that the compound of formula (3) comprises at least two unsaturated, in particular, aliphatic hydrocarbyl groups, preferably at least two, more preferably two allyl groups, and an aromatic compound of the formula (4):

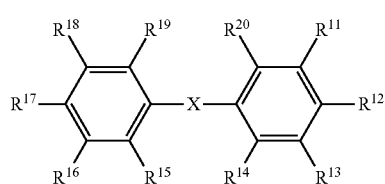

(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up 20 to carbon atoms, —O—$R^{22}$, wherein $R^{22}$ is a saturated or unsaturated optionally substituted hydrocarbyl group with up to 20 carbon atoms, —C(O)—O—$R^{23}$, wherein $R^{23}$ is a saturated or unsaturated optionally substituted hydrocarbyl group with up to 20 carbon atoms, —O—C(O)—$R^{23}$, wherein $R^{23}$ is as defined before, and a silyloxy group of the formula —$OSiR^{24}R^{25}R^{26}$, wherein $R^{24}$, $R^{25}$, and $R^{26}$ are independent from each other selected from optionally substituted hydrocarbyl group with up to 20 carbon atoms, X is selected from the group consisting of the groups:
single bond,
—$R^{27}$—, wherein $R^{27}$ is a divalent linear or cyclic saturated optionally substituted hydrocarbyl group with up to 20 carbon atoms,
—C(O)—,
—S(O)$_2$—,
—S(O)—,
—S—
—O—Si($R^{28}$)$_2$—O—, wherein $R^{28}$ is independently selected from the group of a halogen, and a saturated or unsaturated hydrocarbyl group with up to 6 carbon atoms, and
—O— with the proviso that the compound of formula (4) comprises at least two unsaturated, in particular, aliphatic hydrocarbyl groups, preferably at least two, more preferably two allyl groups.

Compounds (E) of formula (3) or (4) may also comprise allyl groups and vinyl groups (i.e. —CH=CH$_2$-groups which are not bound to a —CH$_2$ group). An example of a group comprising such vinyl groups is a group of formula —O—Si(—CH$_3$)$_2$(—CH=CH$_2$), or a vinyl group attached to an aromatic group.

In a further preferred embodiment of the addition-curable silicone rubber composition according to the invention the diallyl compound (E) is selected from the group consisting of the compounds of the formula:

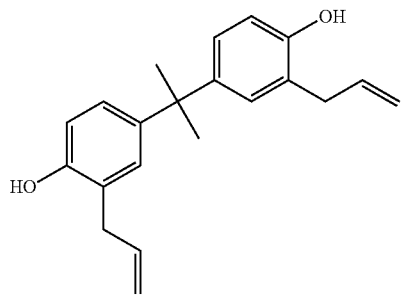

(2-allyl-4-[1-(3-allyl-4-hydroxy-phenyl)-1-methyl-ethyl]phenol (2,2′-diallyl bisphenol A))

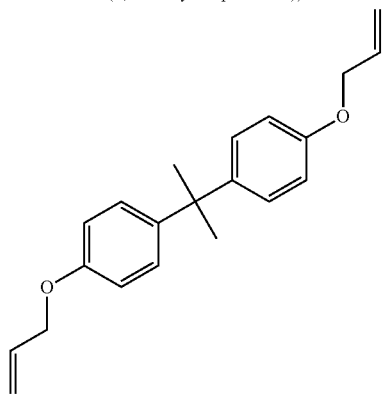

(1-allyloxy-4-[1-(4-allyloxylphenyl)-1-methyl-ethyl]benzene (bisphenol A diallyl ether)))

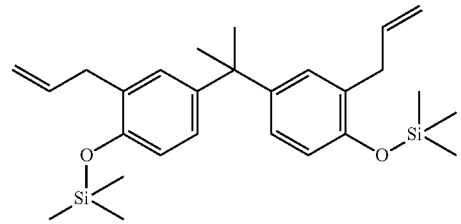

([2-allyl-4-[1-(3-allyl-4-trimethylsilyloxy-phenyl)-1-methyl-ethyl]phenoxy]-trimethyl-silane))

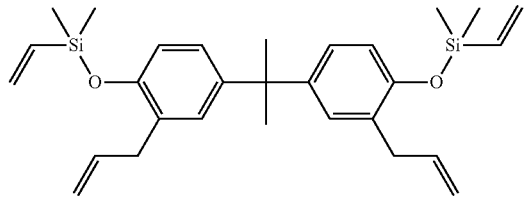

([2-allyl-4-[1-[3-allyl-4-[dimethyl(vinyl)silyl]oxy-phenyl]-1-methyl-ethyl]phenoxy]-dimethyl-vinyl-silane),

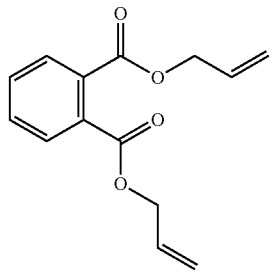

(diallyl phthalate), and

-continued

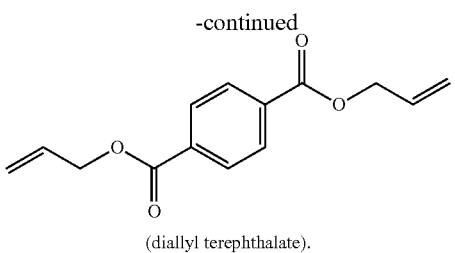

(diallyl terephthalate).

Component (F) is at least one silicone oil having at least one alkyl group having at least two carbon atoms, preferably said alkyl group has 3 to 20 carbon atoms, more preferably 4 to 18 carbon atoms, more preferably 6 to 16 carbon atoms, still more preferably 8 to 14 carbon atoms.

In a further preferred embodiment of the addition-curable silicone rubber composition according to the invention component (F) is a linear polydimethylsiloxane, wherein at least one, preferably at least two methyl groups are replaced by an alkyl group having at least two carbon atoms, wherein said alkyl group is selected from the group consisting of pendent and terminal alkyl groups, preferably from pendent alkyl groups, wherein said alkyl groups preferably have 3 to 20 carbon atoms, more preferably 4 to 18 carbon atoms, more preferably 6 to 16 carbon atoms, still more preferably 8 to 14 carbon atoms.

In a further preferred embodiment of the addition-curable silicone rubber composition according to the invention component (G) is selected from reinforcing fillers having a BET surface area of 50 m²/g or more.

In a further preferred embodiment of the addition-curable silicone rubber composition according to the invention, it comprises:
- 100 parts by weight of the component (A),
- 0.01 to 100 parts by weight of the component (B)
- 0.5 to 1000 ppm, preferably 1 to 100 ppm of the component (C) based on the weight amount of the transition metal and based on the total weight of components (A) and (B),
- 0.05 to 10 parts by weight of component (D)
- 0.01 to 10 parts by weight of component (E),
- 0.01 to 40 parts by weight, preferably 0.01 to 30 parts by weight, more preferably 0.02 to 20 parts by weight, and more preferably 0.02 to 10 parts by weight of component (F),
- 0 to 100 parts by weight of component (G), and
- 0 to 100 parts by weight of component (H).

The present invention further relates to cured silicone rubber composition, obtained by curing the addition-curable silicone rubber composition as defined herein.

The present invention further relates to the use of the addition-curable silicone rubber composition as defined herein for the manufacture of a composite material, comprising a substrate and the cured silicone rubber composition on at least one part of the surface of the substrate.

The present invention further relates to a composite material, comprising a substrate and the cured silicone rubber composition as defined herein on the surface of such substrate. Preferably in such composite material the substrate is selected from the group consisting of polycarbonate, polyester, polyurethane, poly(phenylene oxide), polysulfone, polyvinylalcohol, phenolic resin, epoxy resin, polyamide, polyetherimide, cellulose, glass, and the mixture thereof.

The present invention further relates to a method of manufacturing a composite material, wherein a substrate or a carrier that contains residual hydrosilyl-reacting groups (e.g. hydroxyl group) is coated with or is embedded in the addition-curable silicone rubber composition as defined in any of the previous claims and thereafter the addition-curable silicone rubber composition is cured on the surface of said substrate. In a preferred embodiment of such method the substrate is a thermoplastic resin, and the method at first comprises molding of the thermoplastic resin and thereafter the addition-curable silicone rubber composition as defined herein is over-molded onto the thermoplastic part in the same molding equipment and cured.

DETAILED DESCRIPTION OF THE COMPONENTS OF THE INVENTION

Component (A)

The inventive composition comprises at least one polyorganosiloxane having at least two unsaturated hydrocarbyl residues (component (A)). Component (A) may include one or more polyorganosiloxanes having in average at least two alkenyl groups. Suitable components (A) can be described by the general formula (1), $$[M_a D_b T_c Q_d Z_e]_m \quad (1)$$

wherein the indices in formula (1) represent the ratios of the siloxy units M, D, T and Q, which can be distributed blockwise or randomly in the polysiloxane. Within a polysiloxane each siloxane unit can be identical or different and a=0-10
b=0-2000
c=0-50
d=0-10
e=0-300
m=1-1000
a+b+c+d+e≥2, and
$M=R_3SiO_{1/2}$, or M*
$D=R_2SiO_{2/2}$, or D*
$T=RSiO_{3/2}$, or T*
$Q=SiO_{4/2}$, Z is a divalent optionally substituted hydrocarbyl bridging group with up to 14 carbon atoms between two siloxy groups as defined before, wherein R is selected from optionally substituted hydrocarbyl groups with up to 30 carbon atoms and poly($C_2$-$C_4$)-alkylene ether groups with up to 1000 alkylene oxy units, the groups R being free of aliphatic unsaturation, and wherein $M^*=R^1_p R_{3-p}SiO_{1/2}$,
$D^*=R^1_q R_{2-q}SiO_{2/2}$,
$T^*=R^1 SiO_{3/2}$, wherein
p=1-3,
q=1-2, and
$R^1$ is selected from unsaturated optionally substituted hydrocarbyl groups with up to 30 carbon atoms, the unsaturated optionally substituted hydrocarbyl being preferably alkenyl groups,
with the proviso that there are at least two groups selected from M*, D* and T*.

Preferably a, b, c, d and m being such that the viscosity of component (A) at 25° C. is less than 100000 mPa·s (measured at a shear rate of D=10 s⁻¹ at 25° C.).

The viscosity of component (A) refers to the viscosity of a single component (A) or a mixture of components (A). The latter case of the mixture includes with it the presence of individual components (A) that may have a viscosity exceeding 100000 mPa·s at 25° C., for example resinous components (A) that comprise Q and or T units.

In formula (1) the indices should suitably represent the average polymerisation degree $P_n$ based on the average number molecular mass $M_n$.

In the formula (1):
$M=R_3SiO_{1/2}$, or M*
$D=R_2SiO_{2/2}$, or D*
$T=RSiO_{3/2}$, or T*
$Q=SiO_{4/2}$,
divalent Z, which are bridging groups between siloxy groups above,
wherein each R, which may be the same or different, is preferably selected from optionally substituted alkyl with up to 30 carbon atoms, optionally substituted aryl with up to 30 carbon atoms, poly($C_2$-$C_4$)-alkylene ether with up to 1000 alkylene oxy units, the groups R being free of aliphatic unsaturation, and
wherein $M^*=R^1_pR_{3-p}SiO_{1/2}$, $D^*=R^1_qR_{2-q}SiO_{2/2}$, $T^*=R^1SiO_{3/2}$,
wherein
p=0-3, preferably 1-3,
q=1-2, and
Z is as defined below.

R is preferably selected from n-, iso, or tertiary alkyl, alkoxyalkyl, $C_5$-$C_{30}$-cyclic alkyl, or $C_6$-$C_{30}$-aryl, alkylaryl, which groups can be substituted in addition by one or more O—, N—, S- or F-atom, or poly($C_2$-$C_4$)-alkylene ethers with up to 500 alkylene oxy units, the groups R being free of aliphatic unsaturation, Examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, and cycloaliphatic radicals, such as cyclohexylethyl, aryl radicals, such as phenyl, tolyl, xylyl, aralkyl radicals, such as benzyl and 2-phenylethyl. Preferable monovalent halohydrocarbon radicals have the formula $C_nF_{2n+1}CH_2CH_2$— wherein n has a value of from 1 to 10, such as, for example, $CF_3CH_2CH_2$—, $C_4F_9CH_2CH_2$—, $C_6F_{13}CH_2CH_2$—, $C_2F_5$—O($CF_2$—$CF_2$—O)$_{1-10}CF_2$—, F[CF($CF_3$)—$CF_2$—O]$_{1-5}$—($CF_2$)$_{0-2}$—, $C_3F_7$—OCF($CF_3$)— and $C_3F_7$—OCF($CF_3$)—$CF_2$—OCF($CF_3$)—. Preferred groups for R are methyl, phenyl, 3,3,3-trifluoropropyl, particular preferred is methyl.

$R^1$ is selected from aliphatic unsaturated groups, comprising C═C-group-containing groups (alkenyl groups), e.g.: n-, iso-, tertiary or cyclic alkenyl, $C_6$-$C_{30}$-cycloalkenyl, $C_8$-$C_{30}$-alkenylaryl, cycloalkenylalkyl, vinyl, allyl, methallyl, 3-butenyl, 5-hexenyl, 7-octenyl, ethyliden-norbornyl, styryl, vinylphenylethyl, norbornenyl-ethyl, limonenyl, optionally substituted by one or more O- or F-atoms, or C≡C-group-containing groups (alkinyl groups), optionally comprising one or more O- or F-atoms.

The alkenyl radicals are preferable attached to terminal silicon atoms, the olefin function is at the end of the alkenyl group of the higher alkenyl radicals, because of the more ready availability of the alpha-, omega-dienes used to prepare the alkenylsiloxanes.

Preferred groups for $R^1$ are vinyl, 5-hexenyl, cyclohexenyl, limonyl, styryl, vinylphenylethyl. Most preferred group $R^1$ is a vinyl.

Z includes for example divalent aliphatic or aromatic n-, iso-, tertiary- or cyclo-alkylene with up to 14 carbon atoms, arylene or alkylenearyl groups. Z forms bridging elements between two siloxy units. The content of the Z groups does not exceed 30 mol. % preferably not exceed 20 mol. % of all siloxy units. Preferably Z is absent. Preferred examples of suitable divalent hydrocarbon groups Z include any alkylene residue, preferably such as —$CH_2$—, —$CH_2CH_2$—, —$CH_2(CH_3)CH$—, —$(CH_2)_4$—, —$CH_2CH(CH_3)CH_2$—, —$(CH_2)_6$—, —$(CH_2)_8$— and —$(CH_2)_{18}$—; cycloalkylene radical, such as cyclohexylene; arylene radicals, such as phenylene, xylene and combinations of hydrocarbon radicals, such as benzylene, i.e. —$CH_2CH_2$—$C_6H_4$—$CH_2CH_2$—, —$C_6H_4CH_2$—. Preferred groups are alpha, omega-ethylene, alpha, omega-hexylene or 1,4-phenylene.

Further examples include divalent halohydrocarbon radicals Z e.g. any divalent hydrocarbon group Z wherein one or more hydrogen atoms have been replaced by halogen, such as fluorine, chlorine or bromine. Preferable divalent halohydrocarbon residues have the formula —$CH_2CH_2(CF_2)_{1-10}CH_2CH_2$— such as for example, —$CH_2CH_2CF_2CF_2CH_2CH_2$— or other examples of suitable divalent hydrocarbon ether radicals and halohydrocarbon ether radicals including —$CH_2CH_2OCH_2CH_2$—, —$C_6H_4$—O—$C_6H_4$—, —$CH_2CH_2CF_2OCF_2CH_2CH_2$—, and —$CH_2CH_2OCH_2CH_2CH_2$—.

Such polymers as component (A) containing R, $R^1$ and/or Z radicals preferably are e.g. alkenyl-dimethylsiloxy or trimethylsiloxy terminated polydimethylsiloxanes, which can contain other siloxane units in the chain, like for example alkenylmethylsiloxy groups, diphenylsiloxy groups. forming e.g. poly(dimethyl-co-diphenyl) siloxane chains that are terminated with dimethylsiloxy or trimethylsiloxy groups.

Broadly stated component (A) of the compositions of this invention can be any polyorganosiloxane compound containing two or more silicon atoms linked by oxygen and/or divalent groups Z wherein the silicon is bonded to 0 to 3 monovalent groups per silicon atom, with the proviso that the polyorganosiloxane compound contains at least two silicon-bonded unsaturated hydrocarbon residues.

The siloxane units with radicals R and/or $R^1$ can be equal or different for each silicon atom. In a preferred embodiment the structure is

p=0-3, preferably 1,
m1=10-2000, preferably 100-1000,
n=0-500 preferably 0-200.

One preferred polyorganosiloxane component (A) for the composition of this invention is a substantially linear polyorganosiloxane (A1). The expression "substantially linear" includes polyorganosiloxanes (A1) that contain not more than 0.2 mol. % (trace amounts) of siloxy units of the type T or Q. This means the polymer (A) is preferably a linear, preferably flowable fluid (A1):

     (1a)

wherein $R^1$, R, p and m1 are as defined above, with the proviso, that there are at least two alkenyl groups per molecule. Preferred structures include

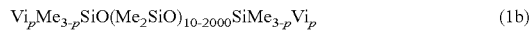     (1b)

     (1c),

In the group of alkenyl comprising siloxanes (A) the addition of a second or third siloxane as component (A2) and/or (A3) is preferred. The purpose of component (A2) and (A3) so-called vinyl rich polymers is to modify mechanical properties and crosslinking density.

The polymers (A2) are selected either from the group consisting of polymers of the formulas (1d) to (1i), i.e. linear polyorganosiloxanes having additional alkenyl side groups wherein the concentration of T- and Q-groups are below 0.2 mol. % or polyorganosiloxanes having a higher concentration of T- and Q-groups than the previous polymer types (A1) or (A2).

The polymers (A2) are represented by the formulas (6)

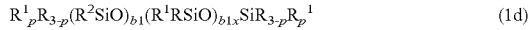  (1d)

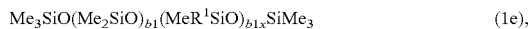  (1e),

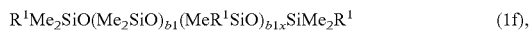  (1f), whereby
b1=>0-2000
b1x=>0-500
b1+b1x=>10-100
$R^1$, R, p are as defined above,
$R^1$=preferably vinyl, hexenyl, cyclohexenyl, limonyl, styryl, vinylphenylethyl. Most preferred $R^1$ is vinyl.

Preferred groups for R are methyl, phenyl, 3,3,3-trifluoropropyl, most preferred is methyl.

The preferred value of b1x is less than 0.5*b1, preferably 0.0001*b1 to 0.25*b1 more preferably 0.0015*b1 to 0.2*b1.

Further preferred structures of (A2) are $Vi_pMe_{3-p}SiO(Me_2SiO)_{10\text{-}2000}(MeViSiO)_{1\text{-}1000}$
$SiMe_{3-p}Vi_p$  (1g), $Me_3SiO(Me_2SiO)_{10\text{-}2000}(MeViSiO)_{1\text{-}1000}SiMe_3$  (1h), $PhMeViSiO(Me_2SiO)_{10\text{-}2000}(MePhSiO)_{1\text{-}1000}SiPh\text{-}$
MeVi  (1i) and wherein Me=methyl, Vi=vinyl, Ph=phenyl, and p=0 to 3, preferred p=1.

In a preferred embodiment component (A) is a mixture of component (A1) and (A2), more preferred mixture of:

  (1a)

and

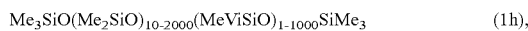  (1d)

wherein R, $R^1$, p, q, m1, b1 and b1x are as defined above, and R is preferably methyl and $R^1$ is preferably vinyl.

The third preferably optionally used component of polymer (A), includes branched polymers (A3), which are preferably selected from those of the formula (4a) wherein the polyorganosiloxane (A3) comprising alkenyl groups have more than 0.2 mol. % of T=$RSiO_{3/2}$ or Q=$SiO_{4/2}$-units.

$[M_{0.4\text{-}4}D_{0\text{-}1000}T_{0\text{-}50}Q_{0\text{-}10}]_{1\text{-}1000}$  (4a)

whereby
M=$R^3SiO_{1/2}$, or M*
D=$R^2SiO_{2/2}$, or D*
T=$RSiO_{3/2}$, or T*
Q=$SiO_{4/2}$,
wherein M*, D* and T* are as defined above, carrying unsaturated groups $R^1$. The amount of such M*, D* and T* units is preferably 0.001 to 20 mol. %, more preferably 0.01 to 15 mol. %, most preferably 0.1 to 10 mol. % based on all siloxy units.

A preferred branched polymer (A3) includes silicone resins comprising at least one branching unit (T=$RSiO_{3/2}$, or T*, Q=$SiO_{4/2}$), which are favorable inter alia to impart strength to the composition such as tensile strength and concurrently to increase the hardness thereof. More illustratively, the silicone resin contain M=$R_3SiO_{1/2}$, or M*, and at least one unit selected from T=$RSiO_{3/2}$, T* and Q=$SiO_{4/2}$, and optionally contains D units selected from D=$R_2SiO_{2/2}$, or D*.

The molar ratio of M unit to T and Q units if combined preferably is:

M/(Q+T)=0.6 to 1.2, preferably 0.7 to 1.1.

The silicone resin may be synthesized, for example, by hydrolyzing the suitable alkoxysilanes or chlorosilanes in such a ratio as to meet the above-mentioned composition. A preferred embodiment of the addition-curable silicone rubber composition comprises at least one polyorganosiloxane selected from (A1) and (A2), and at least one polyorganosiloxane selected from (A3).

The range of the subindices defines a range of the possible average polymerization degrees $P_n$ according to the number average molecular weight $M_n$.

The indices correspond to suitable viscosities as defined later on and describe polymers without any solvent for a viscosity adjustment.

The preferred branched polyorganosiloxanes (A2) and (A3) have usually a higher concentration of unsaturated groups $R^1$. Branched polymers (A3) are described e.g. in U.S. Pat. No. 5,109,095. Preferably the branched vinyl-rich polymers (A3) have a range of D:T>10:1 preferably >33:1 and/or respectively (M:Q)=0.6-4:1, such as e.g. $[M_{0.7}M^*_{0.05}Q]_{10\text{-}500}$  (1j).

All these polymers can be prepared by any of the conventional methods for preparing triorganosiloxane-terminated polydiorganosiloxanes. For example, a proper ratio of the appropriate hydrolyzable silanes, e.g., vinyldimethylchlorosilane, trimethylchlorsilane, tetrachlorosilane, methyltrichlorsilane and dimethyldichlorosilane, or its corresponding alkoxysilanes, can be co-hydrolyzed and condensed. Other reaction routes may run alternately over equilibration reactions of 1,3-divinyltetraorganodisiloxane, e.g. symmetrical divinyldimethyldiphenylsiloxane or divinyltetramethylsiloxane, which furnishes the endgroups of the polydiorganosiloxane, which may be equilibrated with an appropriate polydiorganosiloxane, e.g., octamethylcyclotetrasiloxane, in the presence of an acidic or basic catalyst.

In a preferred embodiment the polymer component (A) is a mixture of polymers of the formula (1a) and/or of the formula (1d) and/or (1j) whereby the mixture has an alkenyl content in average of preferably below 2 mol. % of all siloxy units of the mixture (A), whereby polymer (A1) is present in a higher amount than (A2) or (A3).

The viscosities of the polydiorganosiloxanes (A) defined above for the purposes of this invention, preferably refer to the polyorganosiloxanes essentially free of cyclic polydiorganosiloxanes (less than 1 wt. %, preferably 0.5 wt. % measured for 1 h 150° C. 20 mbar).

The average polymerization degree $P_n$ of the siloxane units (M, D, T, Q) of the polymer (A) measured by GPC measurement versus polystyrene standard based on the average number mol weight $M_n$ is preferably in the range of $P_n$>10 to 2000, the more preferred range is 40 to 1000. The viscosities of such polymers are preferably in the range of 10 to 100,000 mPa·s at 25° C. at a shear rate of D=10 $s^{-1}$, more preferred 40 to 70,000 mPa·s.

Preferably the alkenyl content of the component (A) is in the range of 0.001 to 20 mol %, especially 0.01 to 10 mol % based on the entire organic groups attached to silicon atoms.

The alkenyl content of the components (A) can be determined here by way of $^1H$ NMR—see A. L. Smith (ed.): The Analytical Chemistry of Silicones, J. Wiley & Sons 1991 Vol. 112 pp. 356 et seq. in Chemical Analysis ed. by J. D. Winefordner.

Component (B)—Crosslinker

Suitable polyorganohydrogensiloxanes (B) comprising SiH units can be described by the general formula (2), $$[M^1_{a2}D^1_{b2}T^1_{c2}Q_{d2}Z_{e2}]_{m2} \quad (2)$$

wherein the siloxy units
$M^1$=M, as defined above, or M**,
$D^1$=D, as defined above, or D**,
$T^1$=T, as defined above, or T**,
Q as defined above,
Z as defined above,
M=$HR_2SiO_{1/2}$, D=$HRSiO_{2/2}$, T**=$HSiO_{3/2}$,
a2=0.01-10 preferably =2-5, most preferably =2,
b2=0-1000 preferably =10-500
c2=0-50 preferably =0
d2=0-5 preferably =0
e2=0-3 preferably =0
m2=1-1000, preferably =1-500, most preferably =1,
with the proviso that there are at least two groups selected from M, D and T**.

Preferably the component (B) is selected from polysiloxanes that have only methyl or phenyl groups, even more preferably only methyl groups as organic residues.

Preferably the polyorganohydrogensiloxanes (B) have at least 10, preferably at least 15, more preferably at least 20, still more preferably at least 25 and most preferably at least 30 silicon atoms.

The siloxy units can be distributed blockwise or randomly in the polymer chain.

The aforementioned indices should represent the average polymerization degree $P_n$ based on the average number molecular mass $M_n$.

The range for M-, D-, T- and Q-units present in the molecule can cover nearly all values representing fluids, flowable polymers, liquid and solid resins. It is preferred to use liquid linear, cyclic or branched siloxanes. Optionally these siloxanes can comprise additionally traces of $C_1$-$C_6$-alkoxy or Si-hydroxy groups remaining from the synthesis.

Preferred structures of component (B) in the compositions of this invention are siloxanes of formula (2a) to (2e).

$$H_{a1}(R)_{3-a1}Si[RHSiO]_x[R_2SiO]_y[RR^1SiO]_z$$
$$Si(R)_{3-a1}H_{a1} \quad (2a)$$

more specifically:

$$HR_2SiO(R_2SiO)_y(RR^1SiO)_z(RHSiO)_xSiR_2H \quad (2b)$$

$$HMe_2SiO(Me_2SiO)_y(RR^1SiO)_z(MeHSiO)_xSiMe_2H \quad (2c)$$

$$Me_3SiO(MeHSiO)_xSiMe_3 \quad (2d)$$

$$Me_3SiO(Me_2SiO)_y(RR^1SiO)_z(MeHSiO)_xSiMe_3 \quad (2e)$$

wherein R and $R^1$ are as defined above, R is preferably methyl and/or phenyl, $R^1$ is preferably vinyl, and index 'a1' is 0-1, preferably 0, and preferably
x=2-1000, preferably =2-500,
y=0-650, preferably =0-100,
z=0-65, preferably =0
2≤x+y+z<1000, preferably 10≤x+y+z<650.
Most preferred is $$Me_3SiO(Me_2SiO)_y(RR^1SiO)_z(MeHSiO)_xSiMe_3 \quad (2e)$$

with x, y, z as defined before, i.e. z is preferably 0.

Furthermore the use of resinous polyorganohydrogensiloxanes of the following formula are possible:

$$\{[T^1][R^{29}O_{1/2}]_{n2}\}_{m2} \quad (2f)$$

$$\{[SiO_{4/2}][R^{29}O_{1/2}]_{n2}[M^1]_{0.01-10}[T^1]_{0-50}[D^1]_{0-1000}\}_{m2} \quad (2g)$$

wherein
$T^1$, $M^1$, $D^1$ are as defined above,
n2=0 to 3
m2 is as defined above
$R^{29}$ is hydrogen, $C_1$-$C_{25}$-alkyl, such as methyl, ethyl, n-propyl, iso-propyl, n-, iso- and tert.-butyl, alkanoyl, such acyl, aryl, —N═CHR, such as butanonoxime, alkenyl, such as propenyl,
wherein in each formula (2e)-(2f) the molar ratio of SiH-groups to all Si-atoms is preferably more than 0.01 and preferably up to 0.7, and the total number of Si atoms is preferably at least 7, more preferably at least 15 and even more preferably at least 20.

One preferred embodiment of the compounds (2f) is provided by way of example by monomeric to polymeric compounds which can be described via the formula $[(Me_2HSiO_{0.5})_kSiO_{4/2}]_{1.5-1000}$ wherein index k is from 0.3 to 4. Such liquid or resinous molecules can contain significant concentrations of SiOH— and/or ($C_1$-$C_6$)-alkoxy-Si groups of up to 10 mol. % related to the silicon atoms.

Specific examples of preferred suitable compounds for component (B) in the compositions of this invention include
$Me_3SiO$-$(MeHSiO)_{2-50}$—$SiMe_3$,
$Me_3SiO$-$(MeHSiO)_{2-50}(Me_2SiO)_{1-100}SiMe_3$,
$(MeHSiO)_7$,
$HMe_2SiO$-$(MeHSiO)_{0-60}(Me_2SiO)_{1-250}SiMe_2H$
$HMe_2SiO(Me_2SiO)_{0-30}(MePhSiO)_{0-30}$
  $(MeHSiO)_{2-50}SiMe_2H$,
$Me_3SiO(Me_2SiO)_{0-30}(MePhSiO)_{0-30}$
  $(MeHSiO)_{2-50}SiMe_3$,
$Me_3SiO(Me_2SiO)_{0-30}(Ph_2SiO)_{0-30}(MeHSiO)_{2-50}SiMe_3$,
wherein in each formula the molar ratio of SiH-groups to all Si-atoms is preferably more than 0.01 and the total number of Si atoms is preferably at least 7, more preferably have at least 10, more preferably at least 15, most preferably at least 20 atoms.

Most preferred are compounds of the formula $Me_3SiO$-$(MeHSiO)_{2-50}(Me_2SiO)_{0-100}SiMe_3$, with an SiH-content of at least 0.2 mmol/g, preferably at least 1.5 mmol/g, still more preferably 2 mmol/g.

The component (B) can be used as a single component of one polyorganohydrogensiloxane polymer or mixtures thereof.

If an increase of the cure rate is required, it is preferred to use some organopolysiloxanes (B) having $HMe_2SiO_{0.5}$— units or homo MeHSiO-polymers to adjust the cure rate to shorter times.

If it is necessary to still further increase the cure rate, this can be achieved by way of example via an increase of the molar ratio of SiH to Si-alkenyl, or an increased amount of catalyst (C).

The component (B) has preferably a viscosity at 25° C. from 2 to 2000 mPa·s, preferably from 2 to 1000 mPa·s, still more preferably 5 to 100 mPa·s (preferably measured at a shear rate of D=10 s$^{-1}$).

Preferably the crosslinker (B) should have at least more than 2, more preferably more than 3, in some instances also more than 15 and more than 20 SiH-groups per molecule.

The molar ratio of the total of SiH groups in component (B) to the total of the unsaturated hydrocarbyl residues $R^1$ in component (A) and if present in (B) in the formulation is between 0.8 and 5, preferably 0.9 to 4, more preferably 1 to 2.5, more preferably 1.1 to 2.2 in order to provide good adhesion to the hydroxyl-group containing substrates.

Component (B) is a compound different from component (D).

Component (C)—Catalyst

The inventive composition contains at least one hydrosilylation catalyst as component (C) selected from the group of organo metal compounds, salts or metals, having the ability to catalyze hydrosilylation wherein the metal is selected from the group of Ni, Ir, Rh, Ru, Os, Pd and Pt compounds as taught in U.S. Pat. Nos. 3,159,601; 3,159,662; 3,419,593; 3,715,334; 3,775,452 and 3,814,730. Most preferred are platinum compounds.

The component (C) for the hydrosilylation reaction of the inventive composition is a catalyst compound, which facilitates the reaction of the silicon-bonded hydrogen atoms of component (B) with the silicon-bonded olefinic hydrocarbon substituents of component (A). The metal or organo metal compound is generally based on a platinum group metal. Without wishing to be bound by theory, it is believed that the catalyst (C) includes complexes with sigma- and pi-bonded carbon ligands as well as ligands with S—, N, or P atoms, metal colloids or salts of the afore mentioned metals. The catalyst can be present on a carrier such as silica gel or powdered charcoal, bearing the metal, or a compound or complex of that metal. Preferably, the metal of component (C) is any platinum complex compound.

A typical platinum containing catalyst component in the polyorganosiloxane compositions of this invention is any form of platinum (0), (II) or (IV) compounds, which are able to form complexes. Preferred complexes are Pt-$^{(0)}$-alkenyl complexes, such alkenyl, cycloalkenyl, alkenylsiloxane such vinylsiloxane, because of its easy dispersibility in polyorganosiloxane compostions.

A particularly useful form of the platinum complexes are the Pt$^{(0)}$-complexes with aliphatically unsaturated organosilicon compound such as a 1,3-divinyltetramethyldisiloxane (Vinyl-M2 or Karstedt catalyst:

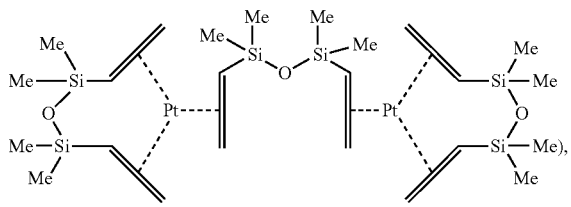

as disclosed by e.g. U.S. Pat. No. 3,419,593 incorporated herein by reference are especially preferred, cyclohexene-Pt, cyclooctadiene-Pt and tetravinyltetramethyl-tetracyclosiloxane (Vinyl-D4)-Pt, e.g. Ashby's catalyst, a Pt(0) complex in tetramethyltetravinylcyclotetrasiloxane with the empirical formula $Pt[(C_3H_6SiO)_4]_x$.

Also preferably is a so-called Lamoreaux catalyst, which is a platinum (II) complex compound, obtained from chloroplatinic acid hexahydrate and octyl alcohol (as described for example in U.S. Pat. No. 3,197,432 or U.S. Pat. No. 3,220,972). Preferably are Pt(O) or Pt(II) catalysts, with preference to Ashby and Lamoreaux platinum catalysts.

The amount of platinum-containing catalyst component that is used in the compositions of this invention is not narrowly limited as long as there is a sufficient amount to accelerate the hydrosilylation between (A) and (B) at the desired temperature in the required time (B) in the presence of all other ingredients of the inventive composition. The exact necessary amount of said catalyst component will depend upon the particular catalyst, the amount of other inhibiting compounds and the SiH to olefin ratio and is not easily predictable. However, for platinum catalysts said amount can be as low as possible due to cost reasons. Preferably, one should add more than one part by weight of platinum for every one million parts by weight of the organosilicon components (A) and (B) to ensure curing in the presence of other undefined inhibiting traces. For the compositions of this invention the amount of platinum containing catalyst component to be applied is preferably sufficient to provide from 1 to 200 ppm preferably 2 to 100 ppm, especially preferred 4 to 60 ppm by weight platinum per weight of polyorganosiloxane components (A) plus (B). Preferably, said amount is at least 4 ppm platinum by weight per sum of (A) and (B).

The hydrosilylation catalyst can also be selected from the group of catalysts capable of being photoactivated. These photo-activatable catalysts preferably contain at least one metal selected from the group composed of Pt, Pd, Rh, Co, Ni, Ir or Ru. The catalysts capable of being photoactivated preferably comprise platinum compounds. Catalyst capable of being photo-activatable is preferably selected among organometallic compounds, i.e. comprise carbon-containing ligands, or salts thereof. In a preferred embodiment, photoactive catalyst (C) has metal carbon bonds, including sigma- and pi-bonds. Preferably, the catalyst capable of being photo-activated (C) is an organometallic complex compound having at least one metal carbon sigma bond, still more preferably a platinum complex compound having preferably one or more sigma-bonded alkyl and/or aryl group, preferably alkyl group(s). Sigma-bonded ligands include in particular, sigma-bonded organic groups, preferably sigma-bonded $C_1$-$C_6$-alkyl, more preferably sigma-bonded methyl groups, sigma-bonded aryl groups, like phenyl, Si and O substituted sigma bonded alkyl or aryl groups, such as trisorganosilylalkyl groups, sigma-bonded silyl groups, like trialkyl silyl groups. Most preferred photoactivatable catalysts include $\eta^5$-(optionally substituted)-cyclopentadienyl platinum complex compounds having sigma-bonded ligands, preferably sigma-bonded alkyl ligands. Further catalysts capable of being photoactivated include ($\eta$-diolefin)-(sigma-aryl)-platinum complexes (see e.g. U.S. Pat. No. 4,530,879).

The catalyst capable of being photoactivated can be used as such or supported on a carrier.

Examples of catalysts capable of being photo-activated include $\eta$-diolefin-$\sigma$-aryl-platinum complexes, such as disclosed in U.S. Pat. No. 4,530,879, EP 122008, EP 146307 (corresponding to U.S. Pat. No. 4,510,094 and the prior art documents cited therein), or US 2003/0199603, and also platinum compounds whose reactivity can be controlled by way for example using azodi-carboxylic esters, as disclosed in U.S. Pat. No. 4,640,939 or diketonates.

Platinum compounds capable of being photo-activated that can be used are moreover those selected from the group having ligands selected from diketones, e.g. benzoylacetones or acetylenedicarboxylic esters, and platinum catalysts embedded into photodegradable organic resins. Other Pt-catalysts are mentioned by way of example in U.S. Pat. No. 3,715,334 or 3,419,593, EP 1 672 031 A1 and Lewis, Colborn, Grade, Bryant, Sumpter, and Scott in Organometallics, 1995, 14, 2202-2213, all incorporated by reference here.

Catalysts capable of being photo-activated can also be formed in-situ in the silicone composition to be shaped, by using Pt⁰-olefin complexes and adding appropriate photo-activatable ligands thereto.

The catalysts capable of being photo-activated that can be used here are, however, not restricted to these above-mentioned examples.

The most preferred catalyst capable of being photo-activated to be used in the process of the invention are ($\eta^5$-cyclopentadienyl)-trimethyl-platinum, ($\eta^5$-cyclopentadienyl)-triphenyl-platinum complexes, in particular, ($\eta^5$-methylcyclopentadienyl)-trimethyl-platinum.

The amount of the catalyst capable of being photo-activatable is preferably 1 to 500 ppm and preferably in the same lower range as defined for the heat-activatable hydrosilylation catalysts mentioned above.

Component (D)—Organosilicon Compound (OSC)

Component D) is at least one organosilicon compound containing at least one polyvalent aromatic group, which is not directly attached to a silicon atom, and at least one Si—H group. The term "which is not directly attached to a silicon atom" is intended to mean that there is no bond of a Si atom to a carbon atom being part of a polyvalent aromatic group, in particular, there is no Si-phenylene-Si group.

Component (D) is different from compound B). Component (D) acts in particular as an adhesion promotor and may also serve as a crosslinking agent.

Component (D) is an organosilicon compound such as an organosilane or organopolysiloxane having at least one SiH group (a hydrogen atom bonded to a silicon atom) and at least one polyvalent aromatic group which is not directly attached to a silicon atom per molecule, and typically having 1 to 60 silicon atoms per molecule. In the present invention, the term polyvalent aromatic group includes in particular divalent to tetravalent aromatic structures, such as a phenylene structure, naphthalene structure, and anthracene structure. Component (D) is preferably an organosilicon compound comprising one or more straight-chain or cyclic optionally substituted organosiloxane moieties containing 1 to 30, preferably 2 to 20, and most preferably 3 to 10 silicon atoms. These organosiloxane moieties further contain at least one, preferably 1 to 20, and most preferably 2 to 10 SiH groups, and at least one, preferably 1 to 4 polyvalent aromatic groups per molecule. Furthermore these organosiloxane moieties optionally contain one or more additional functional groups such as, an alkoxy group, an epoxy group such as glycidoxy group, an alkoxysilyl group such as trimethoxysilyl group, triethoxysilyl group, and methyldimethoxysilyl group, an ester group, an acryl group, a methacryl group, a carboxy group, a carboxy anhydride group, isocyanate group, amino group, or amide group. Specific examples of such compounds include:

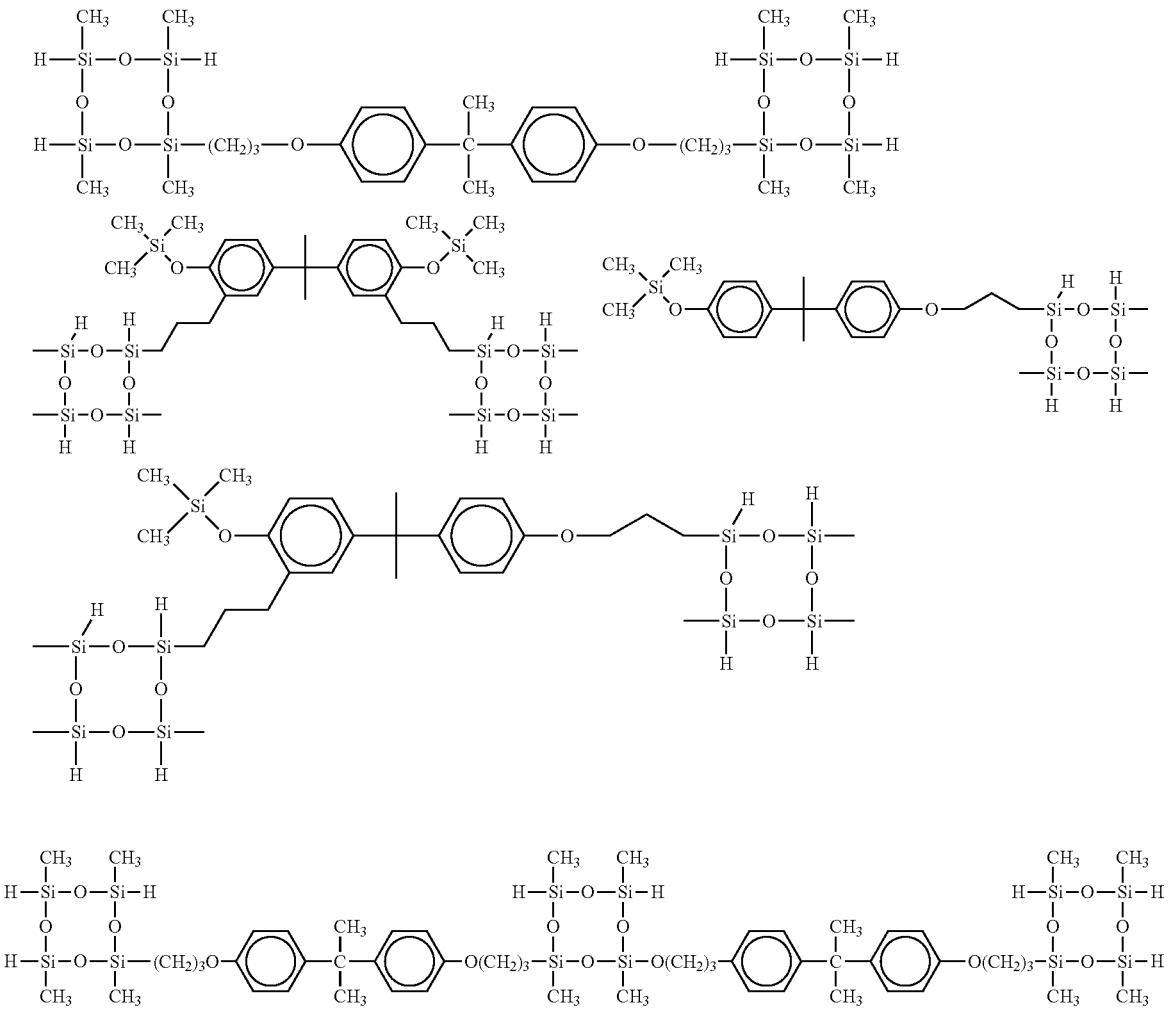

-continued

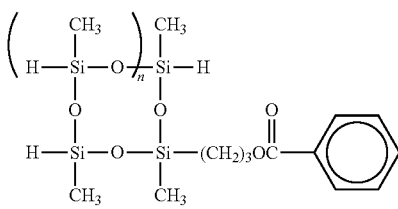 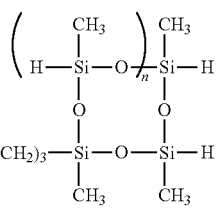 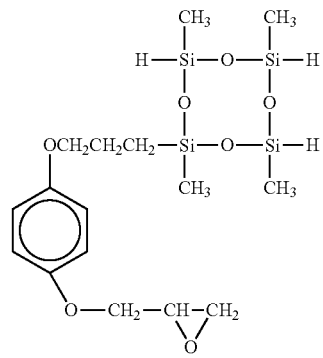

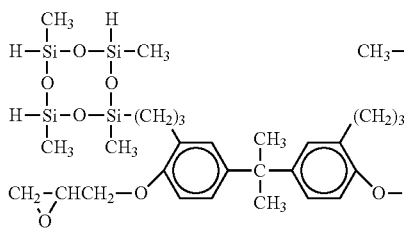 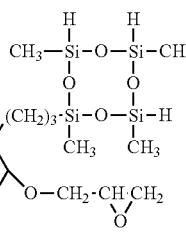 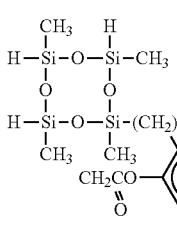 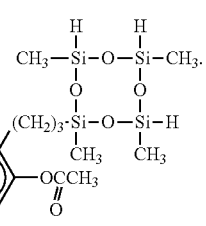

Component (E)—Aromatic Compound with at Least Two Unsaturated Hydrocarbyl Residues The at least one aromatic compound (E) is an aromatic compound that has at least two, preferably two, three or four, more preferably two unsaturated hydrocarbyl groups, preferably allyl groups. The aromatic compound (E) does not contain a siloxane group, that is, it does not comprise a Si—O—Si moiety. The unsaturated hydrocarbyl group is in particular an unsaturated aliphatic group having preferably up to 6 carbon atoms and optionally one or more heteroatoms. Most preferably the unsaturated hydrocarbyl group comprises an allyl group, which for example can be attached to the aromatic group via a carbon atom, an oxygen atom (—O—) or an ester group (—C(O)—O— or —O—C(O)—). The aromatic compound E) comprises at least one aromatic group, preferably having 6 to 10 carbon atoms, most preferably at least one or two phenyl moieties (which may be linked by a linker group or which may be also present as a biphenyl group). The aromatic group(s) in the aromatic compound (E) optionally may have additional, preferably 1 or 2 substituents apart from the unsaturated hydrocarbyl group. Such additional substituents may be selected for example from hydroxyl, halogen, C1-C6-alkyl, C1-C6-alkoxy, C1-C6-alkylcarbonyloxy, C1-C6-alkyloxycarbonyl and tri(C1-C6-hydrocarbyl)siloxy.

Component (E) is an aromatic compound with preferably up to 30 carbon atoms, that comprises at least one aromatic, preferably a carbocyclic aromatic group with 6 to 14 carbon atoms and having at least 2 (e.g. 2, 3 or 4, preferably 2) unsaturated, preferably aliphatic (i.e. non-aromatic) hydrocarbyl residues. Most preferably the unsaturated preferably aliphatic hydrocarbyl residues comprises at least 2, preferably 2 allyl groups, and optionally other unsaturated preferably aliphatic hydrocarbyl residues like in particular vinyl groups (i.e. not bonded to —CH$_2$—).

Preferably such compounds are selected from the group consisting of an aromatic compound of the formula (3):

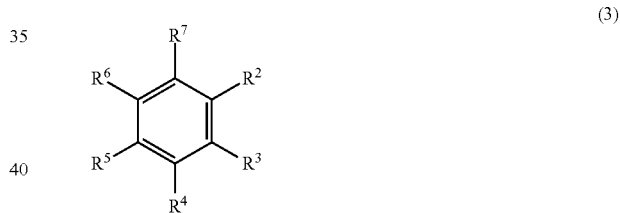

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 6 carbon atoms, —O—$R^9$, wherein $R^9$ is a saturated or unsaturated optionally substituted hydrocarbyl group with up to 6 carbon atoms, —C(O)—O—$R^{10}$, wherein $R^{10}$ is a saturated or unsaturated optionally substituted hydrocarbyl group with up to 6 carbon atoms, and —O—C(O)—$R^{10}$, wherein $R^{10}$ is as defined before, with the proviso that the compound of formula (3) comprises at least two unsaturated, in particular aliphatic, hydrocarbyl groups, preferably at least two allyl groups:

wherein ----- denotes a single bond, and wherein the unsaturated hydrocarbyl group might be bond in particular via an oxygen atom or an ester group (—C(O)—O— or —O—C(O)—) to the aromatic group. In a preferred embodiment the compound of formula (3) has two allyloxycarbonyl groups.

Furthermore compound (E) include an aromatic compound of the formula (4):

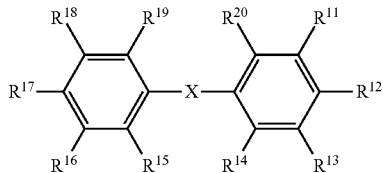
(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up to 20 carbon atoms,
—O—$R^{22}$, wherein $R^{22}$ is a saturated or unsaturated optionally substituted hydrocarbyl group with up to 20 carbon atoms, —C(O)—O—$R^{23}$, wherein $R^{23}$ is a saturated or unsaturated optionally substituted hydrocarbyl group with up to 20 carbon atoms, —O—C(O)—$R^{23}$, wherein $R^{23}$ is as defined before, and a silyloxy group of the formula —OSi$R^{24}R^{25}R^{26}$, wherein $R^{24}$, $R^{25}$ and $R^{26}$ are independent from each other selected from optionally substituted hydrocarbyl group with up to 20 carbon atoms, X is selected from the group consisting of the groups:
single bond,
—$R^{27}$—, wherein $R^{27}$ is a divalent linear or cyclic saturated optionally substituted hydrocarbyl group with up to 20 carbon atoms,
—C(O)—,
—S(O)$_2$—,
—S(O)—,
—S—
—O—Si($R^{28}$)$_2$—O—, wherein $R^{28}$ is independently selected from the group of a halogen, and a saturated or unsaturated hydrocarbyl group with up to 6 carbon atoms, and
—O— with the proviso that the compound of formula (4) comprises at least two unsaturated hydrocarbyl groups, preferably at least two, more preferably two allyl groups, and optionally one or more vinyl-groups.

The unsaturated hydrocarbyl groups might be bonded to the aromatic moiety via an oxygen atom.

Preferred aromatic compounds of formula (4) include for example:

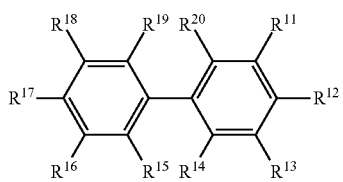
(4-1)

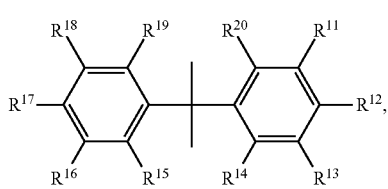
(4-2)

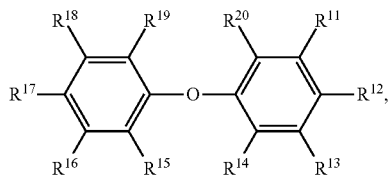
(4-3)

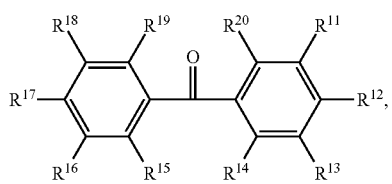
(4-4)

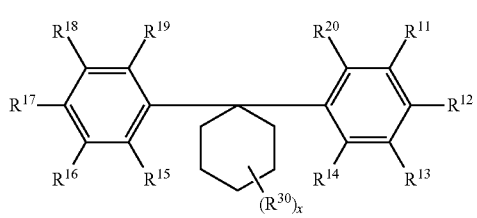
(4-5)

wherein $R^{11}$ to $R^{20}$ are each as defined above, and preferably include hydrogen, hydroxyl, allyl, allyloxy, allyloxycarbonyl, acyloxy, such as acetate, trialkylsiloxy, such as trimethylsiloxy, and $R^{30}$ is a $C_1$-$C_4$ alkyl substituent group at the cyclohexyl group, which is preferably methyl, and x is 0 (no $R^{30}$ group present) to 3. Two groups $R^{30}$ can be at the same carbon atom. Preferred compounds of formula 4-5 include:

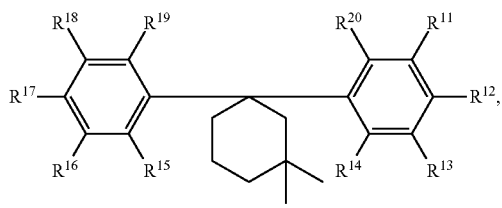
(4-6)

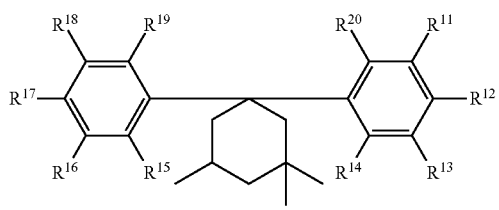
(4-7)

Examples of the compound (E) include for example the compounds of the formula:

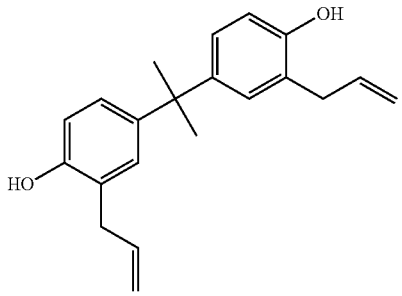

(2-allyl-4-[1-(3-allyl-4-hydroxy-phenyl)-1-methyl-ethyl]phenol
(2,2'-diallyl bisphenol A))

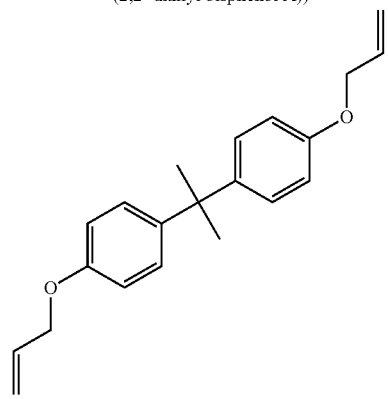

(1-allyloxy-4-[1-(4-allyloxyphenyl)-1-methyl-ethyl]benzene
(bisphenol A diallyl ether))

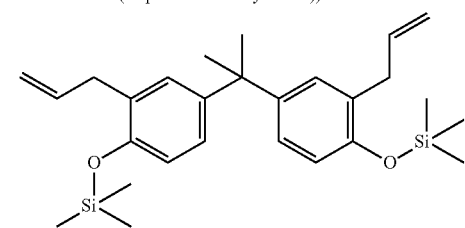

([2-allyl-4-[1-(3-allyl-4-trimethylsilyloxy-phenyl)-1-methyl-ethyl]
phenoxy]-trimethyl-silane)) and

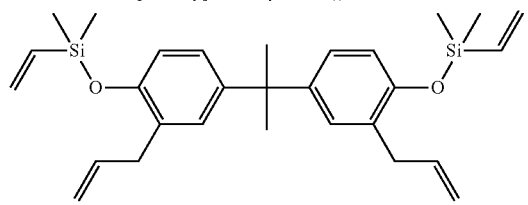

([2-allyl-4-[1-[3-allyl-4-[dimethyl(vinyl)silyl]oxy-phenyl]-1-methyl-
ethyl]phenoxy]-dimethyl-vinyl-silane),

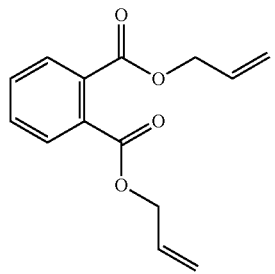

(diallyl phthalate), and

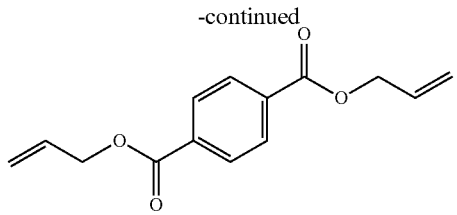

(diallyl terephthalate).

In a preferred embodiment the at least one aromatic compound (E) is an aromatic compound that has at least two, preferably two, three or four, more preferably two unsaturated hydrocarbyl groups, preferably allyl groups. The aromatic compound (E) does not contain a siloxane group, that is, it does not comprise a Si—O—Si moiety. Preferably the aromatic compound (E) also does not contain an ester group (—C(=O)—O— or —O—C(=O)—). Further, preferably the addition-curable silicone rubber composition does not contain a compound having at least one ester group in a molecule. Preferred non-ester compounds (E) include compounds of the formula:

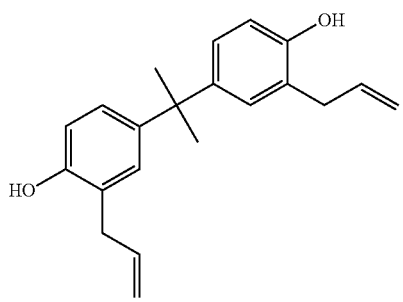

(2-allyl-4-[1-(3-allyl-4-hydroxy-phenyl)-1-methyl-ethyl]phenol
(2,2'-diallyl bisphenol A))

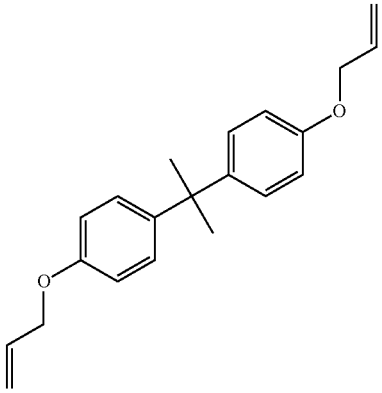

(1-allyloxy-4-[1-(4-allyloxyphenyl)-1-methyl-ethyl]benzene
(bisphenol A diallyl ether)))

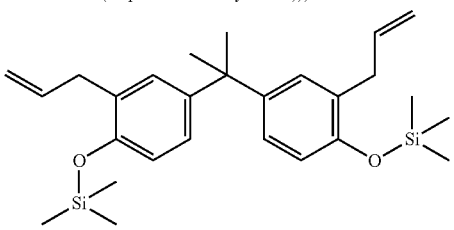

([2-allyl-4-[1-(3-allyl-4-trimethylsilyloxy-phenyl)-1-methyl-ethyl]
phenoxy]-trimethyl-silane)),

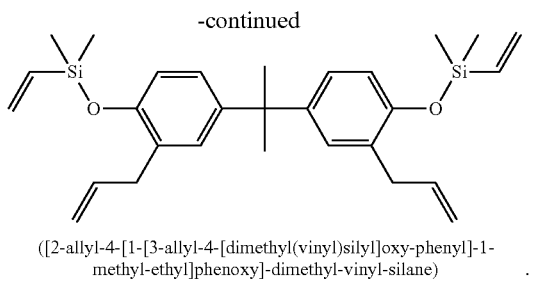

([2-allyl-4-[1-[3-allyl-4-[dimethyl(vinyl)silyl]oxy-phenyl]-1-methyl-ethyl]phenoxy]-dimethyl-vinyl-silane)

Component (F): At Least One Silicone Oil Having at Least One Pendent or Terminal Alkyl Chain Said Alkyl Chain Having at Least Two Carbon Atoms As is well-known for a skilled person in the art usually silicon oils are clear, colourless, non-toxic, neutral, odourless, tasteless, chemically inert, hydrophobic liquids which are stable over a wide temperature spectrum, and have a molecular mass of e.g. 162 to 150,000 g/mol determined for example by GPC against polystyrene as standard. The density might be in a range of 0.76 to 1.07 g/cm³ and the viscosity might be in the range of 0.6 to 1,000,000 mPa s (20° C. e.g. determined according to EN ISO 3219:1994 using a rotational viscometer with defined shear rate). They do not comprise unsaturated hydrocarbyl residues, that is, in particular, hydrosilylation-reactive hydrocarbyl residues, that is, alkenyl or alkenyl groups, as component (A) does, and accordingly are different from component (A). Preferably, they are polyorganosiloxanes, which have only alkyl and optionally aryl groups, in particular, phenyl groups, as organic groups, more preferably, they are polyalkylsiloxanes, that is, polyorganosiloxanes that have only alkyl groups as organic groups. (As is well known to the skilled person in the art the optional aromatic groups are not considered to be unsaturated hydrocarbon groups (see e.g. Wikipedia or IUPAC)). The presence of aromatic groups in the silicon oils of component (F) is, however, not preferred.

The silicone oil (F) is preferably immiscible with vulcanized silicone rubber. It can thus migrate to surface over time at ambient temperature to generate a thin layer of silicone oil on silicone rubber surface, providing lubricity.

In a preferred embodiment of the invention component (F) does not have any aromatic groups. Furthermore, in a preferred embodiment of the invention component (F) does not have halogen atoms. Still further preferred embodiment component (F) is neither aromatic groups nor halogen atoms.

Preferably component (F) has at least one, preferably at least two alkyl groups having at least two carbon atoms, wherein said alkyl group is selected from the group consisting of pendent and terminal alkyl groups, preferably from pendent alkyl groups. Therein, the term "said alkyl group is selected from the group consisting of pendent and terminal alkyl groups" shall intend to mean that component (F) can have only pendent alkyl groups, or can have only terminal alkyl groups, or can have pendent and terminal alkyl groups. Preferably, component (F) has only pendent alkyl groups. A terminal alkyl group shall intend to be a group attached to a silicon atom of a so-called M group in accordance with the usual MDTQ nomenclature of silicones (i.e. R'$_3$SiO$_{1/2}$, where R' is an organic group, e.g. a methyl group, and suitably one group R' is replaced by said terminal alkyl group). A pendent alkyl group shall intend to be a group attached to a silicon atom of a so-called D group in accordance with the usual MDTQ nomenclature of silicones (i.e. R'$_2$SiO$_{2/2}$, where R' is an organic group, e.g. a methyl group, and suitably one group R' is replaced by said terminal alkyl group). In certain preferred embodiments of the invention component (F) may have at least three alkyl groups having at least two carbon atoms, wherein said alkyl group is selected from the group consisting of pendent and terminal alkyl groups, preferably from pendent alkyl groups. More preferably, component (F) is a linear polydimethylsiloxane wherein at least one, preferably at least two methyl groups are replaced by an alkyl group having at least two carbon atoms, wherein said alkyl group is selected from the group consisting of pendent and terminal alkyl groups, preferably from pendent alkyl groups, and wherein said alkyl group preferably has 3 to 20 carbon atoms, more preferably 4 to 18 carbon atoms, more preferably 6 to 16 carbon atoms, still more preferably 8 to 14 carbon atoms.

Preferably, in component (F) the alkyl group can be linear or branched, and preferably the alkyl group is a linear alkyl group. In a preferred embodiment, the alkyl groups can be a mixture of linear and branched alkyl groups, wherein preferably the molar ratio of the linear alkyl groups to the branched alkyl groups is >1, preferably >2.

Preferably, component (F) has terminal trimethylsiloxy-groups, more preferably two terminal trimethylsiloxy-groups. In the latter case component (F) has only pendent alkyl groups having at least two carbon atoms.

In a preferred embodiment of the invention component (F) has a molar percentage of non-silicon-bound carbon to all carbons in a range of 25 mol-% to 95 mol-%, preferably in the range of 40 mol-% to 80 mol-%, more preferably in the range of 45 mol-% to 75 mol-%.

Most preferably component (F) has the formula (5):

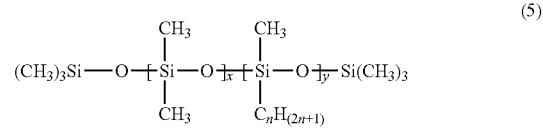

(5)

wherein n is ≥2, preferably n is ≥3, more preferably 20≥n≥3, more preferably 18≥n≥4, more preferably 16≥n≥6, most preferably 14≥n≥8, and x is 0 to 50, preferably 0 to 40, more preferably 0 to 30, and y is 1 to 50, preferably 1 to 40, more preferably 2 to 30, still more preferably 3 to 10. Preferably x+y is 1 to 100, more preferably x+y is 1 to 80, more preferably x+y is 1 to 70, more preferably x+y is 1 to 60, more preferably x+y is 2 to 40. In one embodiment x is zero. If x is zero, y is accordingly 1 to 100, more preferably 1 to 80, more preferably 1 to 70, more preferably 1 to 60, more preferably 1 to 20, more preferably 1 to 10.

In a preferred embodiment of the invention x can be zero. In specific embodiments of the invention component (5) is of the formula (5) with x=about 20, y=about 5 and n=about 12-about 14, or has x=about 0, y=about 4 and n=about 10. In specific embodiments of the invention component (F) has a molar percentage of non-silicon-bound carbon to all carbons of about 49 mol-% or about 72 mol-%, preferably about 52 mol-% or about 72 mol-%.

The amount of component (F) based on 100 parts by weight of component (A) is preferably 0.01 to 40 parts by weight, more preferably 0.02 to 20 parts by weight.

Component (G) Reinforcing Filler

The addition-curable polyorganosiloxane compositions optionally comprise one or more reinforcing fillers, if appropriate surface-modified, reinforcing fillers (G). Reinforcing fillers (G) are characterized in particular by a BET surface area of 50 m²/g or more.

The fillers include by way of example all of the fine-particle fillers, i.e. those having particles smaller than 100 μm, i.e. preferably composed of such particles. These can be mineral fillers, such as silicates, carbonates, nitrides, oxides, or silicas. The fillers are preferably those known as reinforcing silicas, which also permit production of elastomers having sufficient transparency for irradiation. Preferred are reinforcing silicas, in particular those increasing the strength. Examples are silicas whose BET surface areas are from 50 to 400 m²/g, preferably 80 to 350 m²/g, in particular, fumed or precipitated silicas. Preferably these fillers are surface-hydrophobicized. If component (E) is used, its amounts are preferably from 1 to 100 parts by weight, more preferably from 0 to 70 parts by weight, even more preferably from 0 to 50 parts by weight, even more preferably from 5 to 45 parts by weight based on 100 parts by weight of component (A) and (B).

Fillers whose BET surface areas are above 50 m²/g permit production of silicone elastomers with improved properties. In view of strength and transparency fumed silicas are preferred, and even more preferred silicas are, for example, Aerosil® 200, 300, HDK® N20 or T30, Cab-O-Sil® MS7 or HS5 having more than 200 m²/g BET surface area. As BET surface area rises, the transparency of the silicone mixtures in which these materials are present also rises. Examples of trade names of the materials known as precipitated silicas, or wet silicas, are Vulkasil@VN3, or FK 160 from Evonik (formerly Degussa), or Nipsil®LP from Nippon Silica K.K. and others.

It is preferred to use silica fillers having BET-surface areas of 50 m²/g or more, preferably having a BET-surface of at least 150 m²/g. Such compositions can be also photo-activated if desired due to sufficient transparency.

The fillers (G) may be subject of any suitable conventional surface-treatment with suitable surface-treatment agents belonging to hydrophobizing treatment with a suitable hydrophobizing agent, dispersing treatment with suitable dispersing agents which influence the interaction of the filler with the silicone polymer, e.g. influence thickening action. The surface treatment of the fillers is preferably a hydrophobation with silanes or with siloxanes. It can by way of example take place in situ via addition of silazanes, such as hexamethyldisilazane and/or 1,3-divinyltetramethyldisilazane, with addition of water, and 'in-situ'-hydrophobation is preferred. It can also take place with other familiar filler-treatment agents with polyorganosiloxanediols whose chain lengths are from 2 to 50 and which bear unsaturated organic radicals, with the aim of providing reactive sites for the crosslinking reaction.

Examples of commercially available silicas pre-hydrophobized with various silanes are: Aerosil® R 972, R 974, R 976, or R 812, or, for example, HDK 2000 or H30 Examples of trade names for materials known as hydrophobized precipitated silicas or wet silicas are e.g. Sipernat D10 or D15 from Evonik (formerly Degussa).

Rheological properties, i.e. technical processing properties, of the non-cured silicone rubber mixtures can be influenced by the selection the amount of the type of the filler, its amount, and the nature of hydrophobization.

Component (H)—Auxiliary Additives

The addition-curable polyorganosiloxane composition according to the invention may also comprise conventional auxiliary additives.

Such auxiliary additives include for example further adhesion promotors, such as those described in WO 2011/107592:

(Compounds (D1)-(D3), e.g. that is,
(D1): at least one organosiloxane, comprising at least one alkoxy silyl group,
(D2): at least one organosilane, comprising at least one alkoxy silyl group,
(D3): at least one aromatic organic compound having at least two aromatic moieties and at least one group reactive in hydrosilylation,
which compounds shall be different from any of the components A) to F) of the composition of the invention. The preferred ones are included herein by reference to WO 2011/107592 (in the following the definition of the substituent groups refer to the definitions given in WO 2011/107592):
Component (D1) is preferably an polyorganosiloxane comprising at least one unit selected from the group consisting of
$RHSiO_{2/2}$ and
$R^5(R)SiO_{2/2}$,
wherein R is as defined above and may be identical or different, $R^5$ is selected from the group consisting of unsaturated aliphatic group with up to 14 carbon atoms, epoxy-group-containing aliphatic group with up to 14 carbon atoms, cyanurate-containing group, and an isocyanurate-containing group, and
further comprising at least one unit of the formula (3):

$$O_{2/2}(R)Si—R^4—SiR_d(OR^3)_{3-d} \quad (3)$$

wherein
R is selected from optionally substituted alkyl with up to 30 carbon atoms, optionally substituted aryl with up to 30 carbon atoms, and may be identical or different,
$R^3$ is selected from H (hydrogen) and alkyl radicals having 1 to 6 carbon atoms, and may be identical or different,
$R^4$ is a difunctional optionally substituted hydrocarbyl radical with up to 15 carbon atoms, which may contain one or more heteroatoms selected from O, N and S atoms, and which is bond to the silicon atoms via an Si—C-bond, and
d is 0 to 2.

Examples of component (D1) include compounds of the formulas (3a-3d):

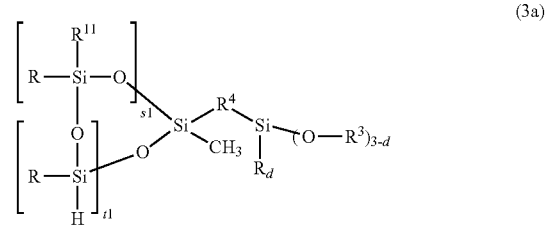

(3a)

$R^{11}$ is R or $R^5$, wherein R, $R^3$, $R^4$ and $R^5$ are as defined above and may be identical or different,
s1=0-6, preferably 1
t1=0-6, preferably 1 or 2
s1+t1=2-6, preferably 2 or 3
with the proviso that there is at least one group —(OSi(R)H)— or —(OSi(R)($R^{11}$))— in the compound, preferably a compound of the formula:

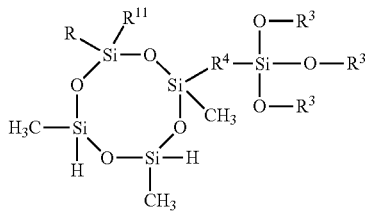

(3b)

wherein R, $R^3$, $R^4$ and $R^{11}$ are as defined before, and ring positions isomers thereof, a compound of the formula:

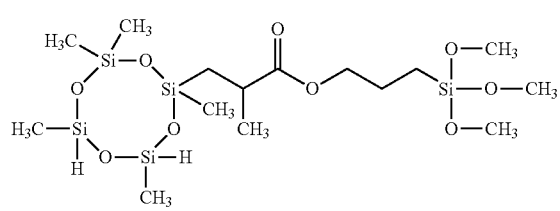

(3c)

and ring positions isomers thereof, a compound of the formula.

Furthermore compounds of formula:

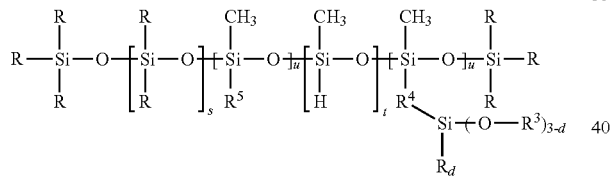

(3d)

wherein:

R, $R^3$, $R^4$, $R^5$ are as defined above, s=0-10 preferably =0-5 t=0-50 preferably =2-30 u=1-10 preferably =1 s+t+u=≤70 with the proviso that there is at least one group —(OSi(R)H)— or —(OSi(R)($R^5$)— in the compound. These compounds may comprise to a certain content Q or T branching groups, replacing the D units.

$R^5$ is for example selected from:

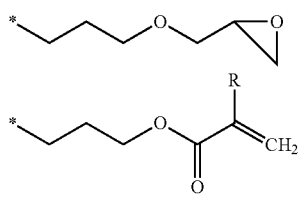

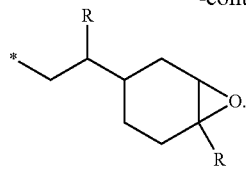

Component (D2) is preferably selected from compounds of the formula (4):

$$X-(CR^6_2)_e-Y-(CH_2)_e SiR_d(OR_3)_{3-d}$$

wherein

X is selected from the group consisting of halogen, pseudohalogen, unsaturated aliphatic group with up to 14 carbon atoms, epoxy-group-containing aliphatic group with up to 14 carbon atoms, cyanurate-containing group, and an isocyanurate-containing group, Y is selected from the group consisting of a single bond, a heteroatomic group selected from —COO—, —O—, —S—, —CONH—, —HN—CO—NH—, $R^6$ is selected from hydrogen and R as defined above, e is 0, 1, 2, 3, 4, 5, 6, 7, or 8, and may be identical or different, R is as defined above and may be identical or different, $R^3$ is as defined above and may be identical or different, d is 0, 1, or 2.

Preferred examples of component (D2) include:

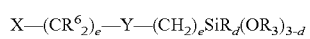
(3e)

(3f)

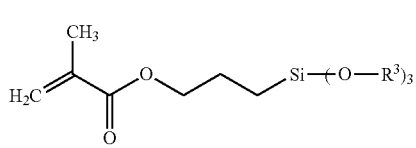

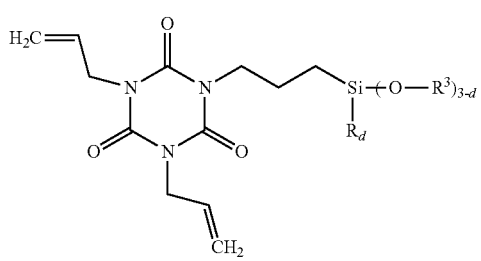
(3g)

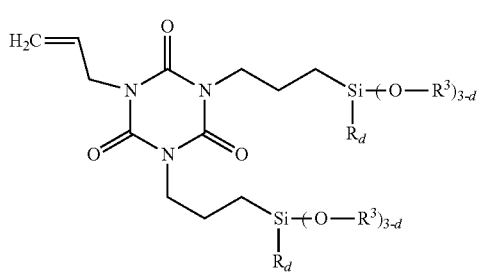
(3h)

wherein R and d are as defined above.

Component (D2) apart from acting as an adhesion promoter, can serve in addition as in-situ surface treating agent for filler (E). It is preferred to use mixtures of silanes of the component (D2) to obtain acceptable adhesion properties at reduced costs. Component (D3) is preferably selected from compounds of the formula (3i):

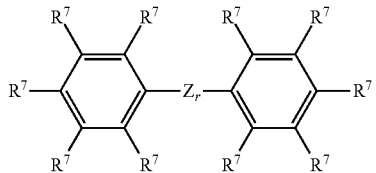
(3i)

wherein r is 0 or 1, $R^7$ may be the same or different group, which is selected from the group consisting of a hydrogen atom, a hydroxyl group, a halogen atom, an alkyl group, alkenyl group, alkoxy group, alkenyloxy group, alkenylcarbonyloxy group and an aryl group, and a group of formula $-E_f-Si(OR)_{3-d}R_d$, wherein R is identical or different, and d is as defined above, a group of formula $—O—Si(R)_2R^1$, wherein R and $R^1$ are as defined above, a group of formula $-E_f-Si(R)_2H$, wherein R is as defined above, wherein E is a divalent organic group with up to 8 carbon atoms and 0 to 3 hetero atomic groups selected from —O—, —NH—, C=O, and —C(=O)O—, and f is 0 or 1, and Z is selected from the following groups:

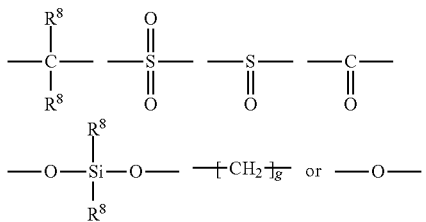

wherein $R^8$ is selected from the group of a hydrogen atom, a halogen atom, or a substituted or unsubstituted alkyl group, aryl group, alkenyl group and alkynyl group, and g is a positive number of at least 2, wherein at least one of the groups selected from $R^7$ and $R^8$ is reactive in hydrosilylation.

Preferred components (D3) include:

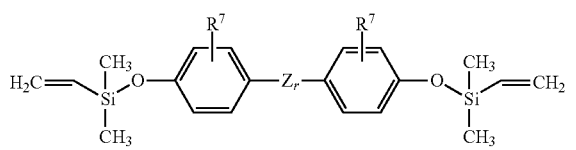
(3k)

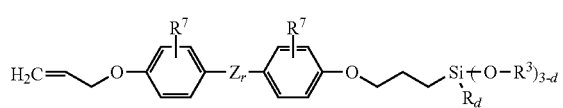
(3l)

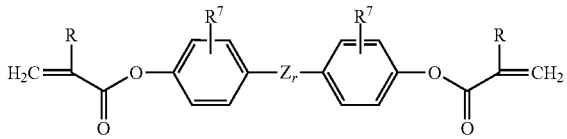
(3n)

wherein $Z_r$, $R^7$, $R^3$, R and d are each as defined above).

The auxiliary or conventional additives can further comprise stabilizers against hot air, oils and solvents, process aids, mould release agents, wettings agents, pigments, all kind of fillers that are different from reinforcing filler component (G), such as functional fillers for increased heat or electrical conductivity, low surface or inert fillers so-called extenders for extended volume, solvents, natural or synthetic fibers optionally for reinforcement (which fibers are not included in component (G) e.g. polyester fiber, cellulose fiber (cotton fiber), polyamide fiber such as Nylon fiber, polyurethane fiber such as Spandex fiber, glass fiber, etc., blowing agents to initiate foaming, anti-microbial, fungicides or additive for increasing mildew resistance.

The auxiliary or conventional additives can further comprise a plasticizer or softener, which is preferably selected from silicone oils, preferably diorganopolysiloxanes; comprising $[R_2SiO]$— units, with R being a C—Si bonded organic group. Silicone oils are usually clear, colorless, non-toxic, inert, odorless, chemically inert, thermally stable, hydrophobic liquids having a number average molecular weight of preferably 162-150000 g/mol, a density from 0.76 to 1.07 g/cm$^3$ and viscosities from 0.6 to 1,000,000 mPa·s (20° C.). Preferred silicone oils include polydimethylsiloxane oils. The use of such silicone oils is preferred to achieve Shore A hardness of ≤20.

Examples of materials serving as fillers or extenders (BET-surface areas <50 m$^2$/g) are known as non-reinforcing fillers. They include for example powdered quartz, diatomaceous earths, powdered crystoballites, micas, aluminum oxides, and aluminum hydroxides. Titanium dioxides or iron oxides, Zn oxides, chalks, or carbon blacks whose BET surface areas are from 0.2 to less than 50 m$^2$/g can be used also as heat stabilizer. These fillers are available under variety of trade names, examples being Sicron®, Min-U-Sil®, Dicalite®, Crystallite®. The materials known as inert fillers or extenders with BET surface areas below 50 m$^2$/g should advantageously comprise no particles (<0.005% by weight) above 100 μm for use in silicone rubbers, in order that further processing generates no problems during downstream processing, e.g. passage through sieves or nozzles, or the mechanical properties of the articles produced therefrom are adversely affected.

Among the opacifying fillers are also in particular non-transparent, in particular inorganic, pigments or carbon black.

The use of these opacifying fillers is preferred only when pigmentation is necessary or the physical function like thermal or electrical conductivity is a requirement.

The use of opaque non-transparent fillers requires changing the usual sequence of the activation and shaping steps in the process. Normally, if no or transparent fillers are used, the photo-activation through irradiation is carried out after the final shaping process. If opaque non-transparent fillers, which would inhibit the photo-activation of the photo-activatable catalyst, are used, the photo-activation step is carried out before the opaque non-transparent fillers are incorporated and the mixture is shaped.

As the person skilled in the art knows, filler can also be a pigment, e.g. organic dyes or pigments or inorganic pigments.

The auxiliary or conventional additives further include e.g. plasticizers, or release oils, or hydrophobicizing oils, such as polydimethylsiloxane oils having a viscosity which is preferably 0.001-10 Pa·s at 25° C. Additional mould-release or flow improving agents can also be used, examples being fatty acid derivatives or fatty alcohol derivatives, fluoroalkyl surfactants. Compounds advantageously used here are those, which separate rapidly and migrate to the surfaces. Stability after exposure to hot air can by way of example be increased using known hot-air stabilizers, such as Fe-, Mn-, Ti-, Ce- or La-compounds, and organic salts of these, preferably their organic complexes.

The auxiliary additives may also include so-called inhibitors for controlling the crosslinking reaction. It is intended to extent the pot-life of the silicone composition to be shaped. The use of such inhibitors may be suitable to decrease the cure rate. Examples of advantageous inhibitors include for example vinylsiloxanes, such as 1,3-divinylte-tramethyldisiloxane, or tetravinyl-tetramethyl-tetracyclosi-loxanes. It is also possible to use other known inhibitors, for example ethynylcyclohexanol, 3-methylbutynol, or dimethylmaleate. In a preferred embodiment of the invention the addition-curable silicone rubber composition contain at least one inhibitor for controlling the crosslinking reaction to decrease the cure rate and to extend pot-life of the addition-curable silicone rubber composition.

In a preferred embodiment addition-curable silicone rubber composition according to the invention the component (H) is selected from the group of an inhibitor; a plasticizer or softener, preferably selected from a silicone oil, more preferably selected from a polydimethylsiloxane oil (different from component (F)); non-reinforcing fillers, preferably selected from fine ground silica or quartz; fiber materials, such as polyester fiber, cellulose fiber, polyamide fiber such as Nylon fiber, polyurethane fiber such as Spandex fiber, and glass fiber.

In a further particular embodiment the addition-curable silicone rubber composition of the invention comprises at least one fiber material. Especially if those fiber materials contain residual SiH-reactive groups, such as hydroxyl groups, adhesion to such materials is improved similarly as to the carrier materials.

In a further particular embodiment the addition-curable silicone rubber composition of the invention comprises at least one inhibitor.

In a further particular embodiment the addition-curable silicone rubber composition of the invention comprises at least one plasticizer or softener.

In a further particular embodiment the addition-curable silicone rubber composition of the invention comprises at least one polyorganosiloxane resin component (A3) as described above.

The composition of the present invention can be prepared by homogeneously mixing components (A)-(H) using suitable mixing means, such as spatula, a drum roller, a mechanical stirrer, a three roll mill, a sigma blade mixer, a dough mixer, a planetary mixer, a horizontal mixer, screws, dissolver, butterfly mixer, press mixer, or a vacuum mixer. The order of mixing components (A)-(H) is not critical, however, it is preferred that certain components can be mixed to form two or more packages which can be stored, if desired, and then mixed in a final step immediately prior to the intended use thereof.

The addition-curable silicone rubber composition according to the invention preferably comprise
  100 parts by weight of component (A),
  0.01 to 100 parts by weight of component (B), preferably 0.5 to 50 parts by weight
  0.5 to 1000 ppm, preferably 1 to 100 ppm of component (C) based on the weight amount of the transition metal and based on the total weight of components (A) and (B),
  0.05 to 10 parts by weight of component (D), preferably 0.1 to 5 parts by weight of component (D),
  0.01 to 10 parts by weight of component (E), preferably 0.02 to 5 parts by weight of component (E),
  0.01 to 40 parts by weight, preferably 0.01 to 30 parts by weight, more preferably 0.02 to 20 parts by weight, and more preferably 0.02 to 10 parts by weight of component (F),
  0 to 100 parts by weight of component (G), preferably 1 to 50 parts by weight of component (G) and
  0 to 100 parts by weight of component (H), preferably 0.001 to 15 parts, preferably from 0.002 to 6 parts by weight of the component (H).

The present invention further relates to cured silicone rubber composition, obtained by curing the addition-curable silicone rubber composition as defined above. Curing may be effected by providing heat or irradiation. Preferably curing is effected by heating the addition-curable silicon rubber composition to temperature of at least 80° C., preferably at least 100° C., for preferably at least 2 minutes, preferably at least 5 minutes.

The present invention further relates to the use of the addition-curable silicone rubber composition as defined above for the manufacture of a composite material, comprising a substrate and the cured silicone rubber composition on at least one part of the surface of the substrate. The substrate maybe also completely coated. Also sandwich structures are possible, connecting more than one piece of the substrate with each other.

The present invention further relates to the composite material, comprising a substrate and the cured silicone rubber composition as defined above on at least part of the surface of such substrate.

The thickness of the cured silicon rubber composition on at least one part of the surface of the substrates may be for example in the range of 1 µm to 10 cm, preferably 1 mm to 5 cm.

Substrates to be coated are for example selected from acrylonitrile-butadiene-styrene (ABS) resins, styrene resins, polyethylene resins, polypropylene resins, polyacetal resins, acrylic resins, polyethylene terephthalate, polybutylene terephthalate, polyphenylene sulfide resins, polyimide resins, polycarbonate, polyester, polyurethane, poly(phenylene oxide), polysulfone, polyvinylalcohol, phenolic resin, epoxy resin, polyamide, polyetherimide, cellulose, glass and the mixture thereof.

The substrates to be coated are preferably selected from materials that have residual hydrosilyl-reacting groups (i.e. Si—H-reactive groups), such as hydroxyl groups, at the surface thereof. Such substrates include for example polymers, in the preparation of which alcohols, in particular polyols are used, leading to unreacted hydroxyl groups at the surface of the substrates. Such polymers include in particular polycarbonates, polyesters, polyurethanes, poly(phenylene oxide), polysulfones, polyvinylalcohols, phenolic resins, epoxy resins preferably polycarbonates.

Furthermore glass and cellulose are suitable substrates to be coated with the addition-curable silicone rubber composition of the invention.

The present invention further relates to a method of manufacturing said composite material, wherein the substrate that contains residual functional groups, preferably SiH-reactive groups such as hydroxyl groups on the surface thereof is coated with the addition-curable silicone rubber composition as defined above and thereafter the addition-curable silicone rubber composition is preferably thermally cured on the surface of said substrate. Said residual functional groups, preferably SiH-reactive groups such as hydroxyl groups are supposed to react with SiH groups from the silicone rubber composition. In a preferred embodiment of such method it comprises the molding of the thermoplastic resin and thereafter the addition-curable silicone rubber composition as defined above is over-molded onto the thermoplastic part in the same molding equipment and cured. Such processes for example include two-shot or multiple-shot over-molding processes. Most preferred the addition-curable silicone rubber composition according to the invention is directly coated on the surface of the substrate, that is, there is no primer applied first on the substrate. Without being bound to theory this invention is supposed to unveil the synergy between the organosilicon compound (D) (OSC) and the aromatic diallyl compound (E) (DAC), which enables in particular the bonding of LSR to any substrate that contains residual hydroxyl groups on its surface, including for example polycarbonate, polyester and glass. The aromatic diallyl compounds (E) are supposed to be immiscible with LSR and therefore migrate to the LSR surface. As the aromatic diallyl compounds (E) can chelate the platinum catalyst dispersed in the LSR bulk they have it concentrated at the LSR/substrate interface due to aromatic diallyl compound (E)'s immiscibility with LSR. The enrichment of platinum at the interface then promotes the dehydrogenative condensation reaction between the Si—H group from the organosilicon compound (D) and the residual OH groups on the substrate surface. In the meantime, both the organosilicon compound (D) and the aromatic diallyl compound (E) will be attached to the silicone matrix (such as PDMS) through hydrosilylation; and as a result, covalent bonds are generated between LSR and the substrate (see FIG. 1). According to this understanding the bonding essentially would not occur at a silicone/metal interface due to the lack of OH group on metal surface. The chelating strength between the aromatic diallyl compound (E) and Pt is supposed to be not too strong, so as to behave as an inhibitor to the bonding reactions. In the absence of the aromatic diallyl compound (E) the catalytic Pt concentration at the interface may be too low to facilitate the reaction effectively. Accordingly, the supposed mechanism of the present invention lies in the surface enrichment of catalytic platinum via an LSR-incompatible aromatic diallyl compound (E), which promotes the bonding reaction between the LSR and the substrate, but essentially does not act as a hydrosilylation catalyst inhibitor, thereby eliminating the need for a primer use during injection molding or over-molding processes. Silicone oil (F) is appropriately immiscible with vulcanized silicone rubber. It can migrate to surface over time at ambient temperature to generate a thin layer of silicone oil on silicone rubber surface, providing lubricity.

The addition-curable silicone rubber compositions of the invention can be used in various applications for example in the manufacture of mobile phone cases, mobile gaskets, safety masks, intravenous access devices, electronic accessories, tools, aerospace, packaging and automotive. A particular field of application is the use as self-bonding LSR for PC and PBT in particular in primer-less solutions (when no primer is applied previously). The addition-curable silicone rubber compositions of the invention may be used in making articles waterproof, for making aesthetic designs, for making protections to electronics, for improving mounting efficiency of articles during the assembly of devices. Further applications include coated articles for seals in mechanical engineering, automotive applications such as automotive connectors and gaskets electrical goods such as insulators, keyboards, food packaging such as bottle caps, coffee capsules, closing or dosing caps or closing or metering valves, respectively, food containers, kitchen appliances such as dough scrapers, plates, bowls, diving masks, face masks, teethers, baby suckers, furniture, shelves, design objects which are haptically designed with silicone elastomers, applications for textiles and shoes, brand emblems, sports and recreational equipment such as watch straps, tools, tool handles, syringe plungers, intravenous valves, needle-free access valves, O-rings, stoppers, scrapers or spatulas, implants, tubes or valves optionally with integrated flange elements, tubes with integrated pipe bends.

In the following the preferred embodiments of the invention are summarized:

1. Addition-curable silicone rubber composition, comprising:
   (A) at least one polyorganosiloxane having at least two unsaturated hydrocarbyl residues,
   (B) at least one polyorganohydrogensiloxane,
   (C) at least one hydrosilylation catalyst, comprising a transition metal,
   (D) at least one organosilicon compound containing at least one polyvalent aromatic group, which is not directly attached to a silicon atom, and at least one Si—H group, different from compound B),
   (E) at least one aromatic compound with at least two unsaturated hydrocarbyl groups, which aromatic compound does not contain a siloxane group,
   (F) at least one silicone oil having at least one alkyl group having at least two carbon atoms,
   (G) optionally one or more reinforcing fillers, and
   (H) optionally one or more auxiliary additives.

2. Addition-curable silicone rubber composition, according to embodiment 1, wherein component (A) is selected from one or more polyorganosiloxanes of the general formula (1):

$$[M_a D_b T_c Q_d Z_e]_m \qquad (1)$$

wherein
a=0-10
b=0-2000, preferably ≥300
c=0-50
d=0-10
e=0-300
m=1-1000, with
a+b+c+d+e≥2, preferably ≥300 and
M=$R_3SiO_{1/2}$, or M*
D=$R_2SiO_{2/2}$, or D*
T=$RSiO_{3/2}$, or T*
Q=$SiO_{4/2}$,
Z is a divalent optionally substituted hydrocarbyl bridging group with up to 14 carbon atoms between two siloxy groups as defined before,
wherein R is selected from optionally substituted hydrocarbyl groups with up to 30 carbon atoms and poly($C_2$-

$C_4$)-alkylene ether groups with up to 1000 alkylene oxy units. the groups R being free of aliphatic unsaturation, and wherein $M^* = R^1_p R_{3-p} SiO_{1/2}$,
$D^* = R^1_q R_{2-q} SiO_{2/2}$,
$T^* = R^1 SiO_{3/2}$, wherein
p=1-3,
q=1-2, and
$R^1$ is selected from unsaturated optionally substituted hydrocarbyl groups with up to 30 carbon atoms,
with the proviso that there are at least two groups selected from M*, D* and T*.

3. Addition-curable silicone rubber composition, according to embodiments 1 or 2, wherein component (B) is selected from one or more polyorganohydrogensiloxanes of the general formula (2):

$$[M^1_{a2} D^1_{b2} T^1_{c2} Q_{d2} Z_{e2}]_{m2} \quad (2)$$

wherein the siloxy units
$M^1 = M$, as defined above, or M**,
$D^1 = D$, as defined above, or D**,
$T^1 = T$, as defined above, or T**,
Q as defined above,
Z as defined above,
$M^{} = HR_2SiO_{1/2}$, $D^{} = HRSiO_{2/2}$, $T^{**} = HSiO_{3/2}$,
a2=0.01-10 preferably =2-5, most preferably =2
b2=0-1000 preferably =10-500
c2=0-50 preferably =0
d2=0-5 preferably =0 e2=0-3 preferably =0
m2=1-1000, preferably =1-500, most preferably =1,
with the proviso that there are at least two groups selected from M, D and T**.

4. Addition-curable silicone rubber composition, according to any of embodiments 1 to 3, wherein component (C) is selected from hydrosilylation catalysts comprising platinum.

5. Addition-curable silicone rubber composition, according to any of embodiments 1 to 4, wherein component (D) is an organosilicon compound comprising one or more straight-chain or cyclic optionally substituted organosiloxane moieties containing 1 to 30 silicon atoms, at least one Si—H group, and at least one polyvalent aromatic group, which is not directly attached to a silicon atom.

6. Addition-curable silicone rubber composition, according to any of embodiments 1 to 5, wherein the compound (E) is selected from the group consisting of an aromatic compound of the formula (3):

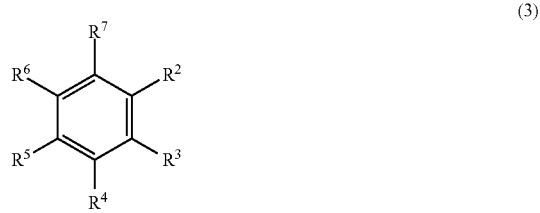

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 6 carbon atoms, —O—$R^9$, wherein $R^9$ is a saturated or unsaturated optionally substituted hydrocarbyl group with up to 6 carbon atoms, —C(O)—O—$R^{10}$, wherein $R^{10}$ is a saturated or unsaturated optionally substituted hydrocarbyl group with up to 6 carbon atoms, and —O—C(O)—$R^{10}$, wherein $R^{10}$ is as defined before, with the proviso that the compound of formula (3) comprises at least two unsaturated hydrocarbyl groups, preferably at least two allyl groups, and an aromatic compound of the formula (4):

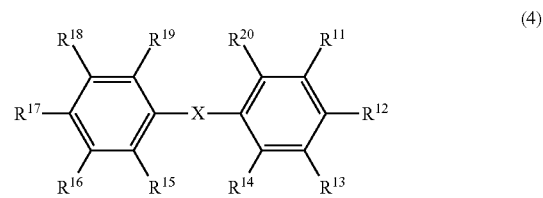

(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up to 20 carbon atoms, —O—$R^{22}$, wherein $R^{22}$ is a saturated or unsaturated optionally substituted hydrocarbyl group with up to 20 carbon atoms, —C(O)—O—$R^{23}$, wherein $R^{23}$ is a saturated or unsaturated optionally substituted hydrocarbyl group with up to 20 carbon atoms, —O—C(O)—$R^{23}$, wherein $R^{23}$ is as defined before, and a silyloxy group of the formula —OSi$R^{24}R^{25}R^{26}$, wherein $R^{24}$, $R^{25}$, and $R^{26}$ are independent from each other selected from optionally substituted hydrocarbyl group with up to 20 carbon atoms, X is selected from the group consisting of the groups:
single bond,
—$R^{27}$—, wherein $R^{27}$ is a divalent linear or cyclic saturated optionally substituted hydrocarbyl group with up to 20 carbon atoms,
—C(O)—,
—S(O)$_2$—,
—S(O)—,
—S—
—O—Si($R^{28}$)$_2$—O—, wherein $R^{28}$ is independently selected from the group of a halogen, and a saturated or unsaturated hydrocarbyl group with up to 6 carbon atoms, and
—O— with the proviso that the compound of formula (4) comprises at least two unsaturated hydrocarbyl groups, preferably at least two allyl groups.

7. Addition-curable silicone rubber composition, according to any of embodiments 1 to 6, wherein the compound (E) is selected from the group consisting of the compounds of the formula:

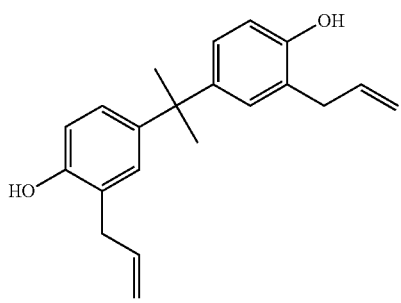

(2-allyl-4-[1-(3-allyl-4-hydroxy-phenyl)-1-methyl-ethyl]phenol
(2,2'-diallyl bisphenol A))

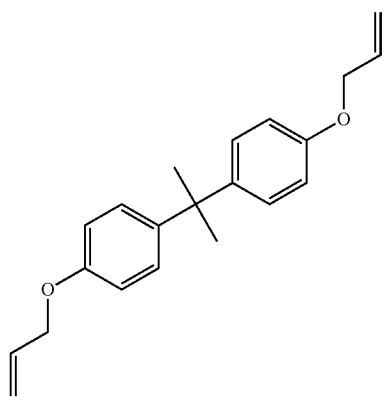

(1-allyloxy-4-[1-allyloxyphenyl)-1-methyl-ethyl]benzene
(bisphenol A diallyl ether)))

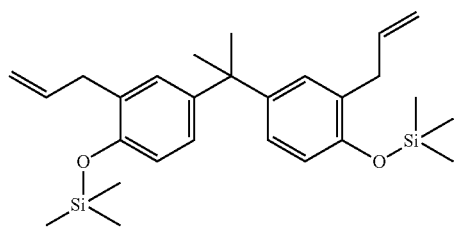

([2-allyl-4-[1-(3-allyl-4-trimethylsilyloxy-phenyl)-1-methyl-
ethyl]phenoxy]-trimethyl-silane)),

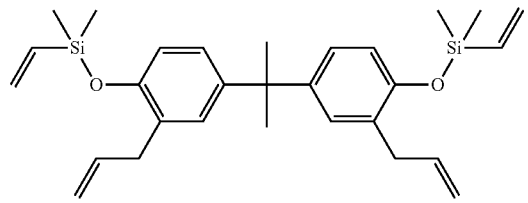

([2-allyl-4-[1-[3-allyl-4-[dimethyl9vinyl)silyl]oxy-phenyl]-1-methyl-
ethyl]phenoxy]-dimethyl-vinyl-silane),

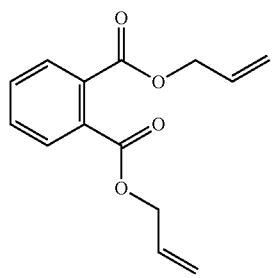

(diallyl phthalate), and

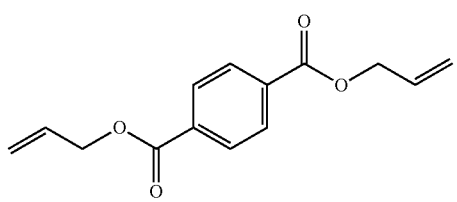

(diallyl terephthalate)

8. Addition-curable silicone rubber composition according to any of embodiments 1 to 7, wherein component (E) does not contain an ester group.

9. Addition-curable silicone rubber composition, according to any of embodiments 1 to 8, wherein the compound (E) is selected from the group consisting of the compounds of the formula:

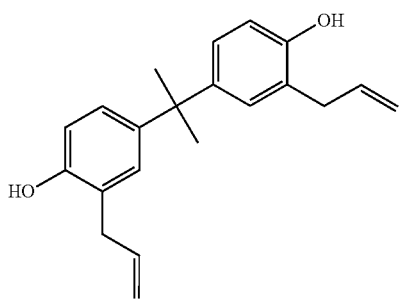

(2-allyl-4-[1-(3-allyl-4-hydroxy-phenyl)-1-
methyl-ethyl]phenol (2,2'-diallyl bishphenol A))

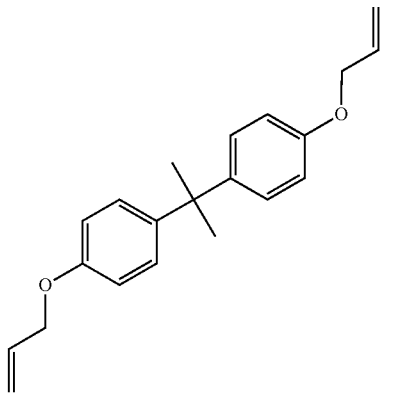

(1-allyloxy-4-[1-(4-allyloxyphenyl)-1-
methyl-ethyl]phenol (bisphenol A diallyl ether))

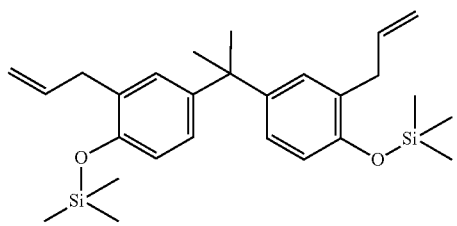

([2-allyl-4-[1-(3-allyl-4-trimethylsilyoxy-phenyl)-1-
methyl-ethyl]phenoxy]-trimethyl-silane)), -continued

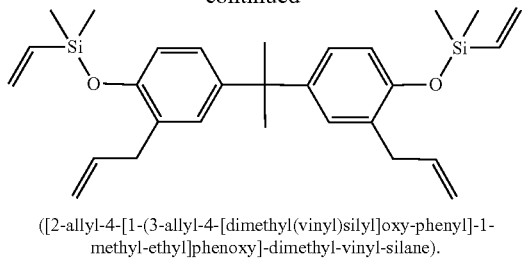

([2-allyl-4-[1-(3-allyl-4-[dimethyl(vinyl)silyl]oxy-phenyl]-1-methyl-ethyl]phenoxy]-dimethyl-vinyl-silane).

10. Addition-curable silicone rubber composition according to any of embodiments 1 to 9, wherein component (F) does not have aromatic groups.

11. Addition-curable silicone rubber composition according to any of embodiments 1 to 10, wherein component (F) does not have halogen atoms.

12. Addition-curable silicone rubber composition according to any of embodiments 1 to 11, wherein component (F) has at least one, preferably at least two alkyl groups having at least two carbon atoms, wherein said alkyl group is selected from the group consisting of pendent and terminal alkyl groups, preferably from pendent alkyl groups.

13. Addition-curable silicone rubber composition according to any of embodiments 1 to 12, wherein component (F) is a linear polydimethylsiloxane, wherein at least one, preferably at least two methyl groups are replaced by an alkyl group having at least two carbon atoms, wherein said alkyl group is selected from the group consisting of pendent and terminal alkyl groups, preferably from pendent alkyl groups.

14. Addition-curable silicone rubber composition according to any of embodiments 1 to 13, wherein component (F) has at least one, preferably at least two alkyl groups having at least two carbon atoms having 3 to 20 carbon atoms.

15. Addition-curable silicone rubber composition according to any of embodiments 1 to 14, wherein component (F) has at least one linear pendent and/or terminal alkyl chain.

16. Addition-curable silicone rubber composition according to any of embodiments 1 to 15, wherein component (F) has terminal trimethylsiloxy-groups.

17. Addition-curable silicone rubber composition according to any of embodiments 1 to 16, wherein component (F) has a molar percentage of non-silicon-bound carbon to all carbons in a range of 30 mol-% to 95 mol-%.

18. Addition-curable silicone rubber composition according to any of embodiments 1 to 17, wherein component (F) has the formula (5):

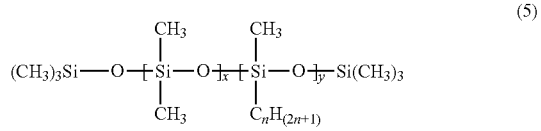
(5)

wherein n is ≥2, preferably n is ≥3, more preferably 20≥n≥3, and x is 0 to 50, and y is 1 to 50.

19. Addition-curable silicone rubber composition according to any of embodiments 1 to 18, wherein component (G) is selected from reinforcing fillers having a BET surface area of 50 m²/g or more.

20. Addition-curable silicone rubber composition according to any of embodiments 1 to 19, wherein component (H) is selected from the group of an inhibitor; a plasticizer or softener, preferably selected from a polydimethylsiloxane oil; non-reinforcing fillers, preferably selected from fine ground silica or quartz; fiber materials, such as polyester fiber, cellulose fiber, polyamide fiber such as Nylon fiber, polyurethane fiber such as Spandex fiber, and glass fiber.

21 Addition-curable silicone rubber composition according to any of embodiments 1 to 20, comprising:
  100 parts by weight of component (A),
  0.01 to 100 parts by weight of component (B)
  0.5 to 1000, preferably 1 to 100 ppm of component (C) based on the weight amount of the transition metal and based on the total weight of components (A) and (B),
  0.05 to 10 parts by weight of component (D)
  0.01 to 10 parts by weight of component (E),
  0.01 to 40 parts by weight of component (F),
  0 to 100 parts by weight of component (G), and
  0 to 100 parts by weight of component (H).

22. Cured silicone rubber composition, obtained by curing the addition-curable silicone rubber composition as defined in any of embodiments 1 to 21.

23. Use of the addition-curable silicone rubber composition as defined in any of embodiments 1 to 21 for the manufacture of a composite material, comprising a substrate and the cured silicone rubber composition on at least one part of the surface of the substrate.

24. Composite material, comprising a substrate and the cured silicone rubber composition as defined in embodiment 22 on the surface of such substrate.

25. Composite material, as defined in embodiment 24, wherein the substrate is selected from the group consisting of acrylonitrile-butadiene-styrene resins, styrene resins, polyethylene resins, polypropylene resins, polyacetal resins, acrylic resins, polyethylene terephthalate, polybutylene terephthalate, polyphenylene sulfide resins, polyimide resins, polycarbonate, polyester, polyurethane, poly(phenylene oxide), polysulfone, polyvinylalcohol, phenolic resin, epoxy resin, polyamide, polyetherimide, cellulose, glass and the mixture thereof.

26. A method of manufacturing a composite material according to embodiments 24 or 25, wherein a substrate that contains residual hydrosilyl-reaction groups, preferably hydroxyl groups, is coated with the addition-curable silicone rubber composition as defined in any of embodiments 1 to 21 and thereafter the addition-curable silicone rubber composition is cured on the surface of said substrate.

27. A method according to embodiment 26, wherein the substrate is a thermoplastic resin, and wherein the method comprises the molding of the thermoplastic resin and thereafter the addition-curable silicone rubber composition as defined in any of embodiments 1 to 22 is over-molded onto the thermoplastic part in the same molding equipment and cured.

28 Use of the addition-curable silicone rubber composition as defined in any of embodiments 1 to 21, or the composite material as defined in any of the embodiments 23 to 24 for the manufacture of electronic devices or parts thereof, such as mobile phone cases, for the manufacture of mobile gaskets, for the manufacture of safety masks, for the manufacture of intravenous access devices, for the manufacture of electronic accessories, for the manufacture of tools, for the manufacture of aerospace articles or devices, for the manufacture of packagings and for the manufacture of automotive parts.

29. Use of the addition-curable silicone rubber composition as defined in any of embodiments 1 to 21 as self-bonding LSR for PC and PBT in particular in primer-less solutions (when no primer is applied previously).

30. Use of the addition-curable silicone rubber composition as defined in any of embodiments 1 to 21 or the composite material as defined in any of the embodiments 23 to 24 for making articles waterproof, for making aesthetic designs, for making protections to electronics, for improving mounting efficiency of articles during the assembly of devices.

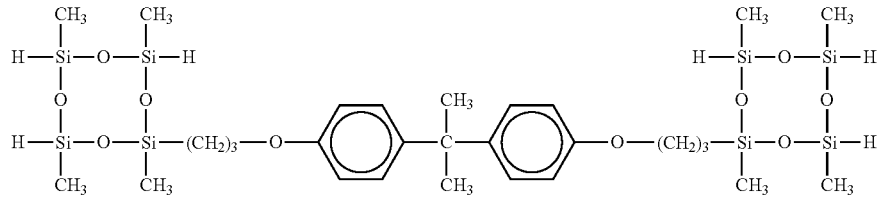

31. Use of the addition-curable silicone rubber composition as defined in any of embodiments 1 to 21 for the manufacture of coated articles for seals, in mechanical engineering, for automotive applications such as automotive connectors and gaskets, for the manufacture of electrical goods such as insulators, for the manufacture of keyboards, for the manufacture of food packagings such as bottle caps, coffee capsules, closing or dosing caps or closing or metering valves, respectively, for the manufacture of food containers, for the manufacture of kitchen appliances such as dough scrapers, plates, bowls, for the manufacture of diving masks, for the manufacture of face masks, for the manufacture of teethers, for the manufacture of baby suckers, for the manufacture of furnitures, for the manufacture of shelves, for the manufacture of design objects which are haptically designed with silicone elastomers, for the manufacture of textiles and shoes, for the manufacture of brand emblems, for the manufacture of sports and recreational equipment, for the manufacture of watch straps, for the manufacture of tools, in particular, tool handles, for the manufacture of medical devices such as syringe plungers, intravenous valves, needle-free access valves, O-rings, stoppers, scrapers or spatulas, implants, for the manufacture of tubes or valves optionally with integrated flange elements, for the manufacture of tubes with integrated pipe bends.

32. Electronic devices or parts thereof, such as mobile phone cases, mobile gaskets, safety masks, electronic accessories, tools, aerospace articles or devices, packagings, automotive parts, waterproof articles, aesthetic designs, protections to electronics, coated articles for seals, mechanical engineering articles, automotive parts, electrical goods such as insulators, keyboards, food packagings such as bottle caps, coffee capsules, closing or dosing caps or closing or metering valves, respectively, food containers, kitchen appliances such as dough scrapers, plates, bowls, diving masks, face masks, teethers, baby suckers, furnitures, shelves, design objects which are haptically designed with silicone elastomers, textiles and shoes, brand emblems, sports and recreational equipment, watch straps, tools, in particular, tool handles, medical devices such as syringe plungers, intravenous valves, scrapers or spatulas, implants, tubes or valves optionally with integrated flange elements, tubes with integrated pipe bends, each comprising the cured silicone rubber composition as obtained by curing the addition-curable silicone rubber composition as defined in any of embodiments 1 to 21, or the composite material as defined in any of the embodiments 23 to 24.

The present invention is explained in more detail in the following examples.

EXAMPLES

Starting Materials
The general method of making the OSC-1 molecule is described as follows:

A 500 mL, 4-necked round bottom flask was equipped with a condenser, an addition funnel and a thermometer and an overhead stirrer. 38.9 g of cyclic tetramethyltetrasiloxane and 80 mL toluene were charged to the flask at room temperature. Temperature was raised to 80° C. using an oil bath. 2 ppm of chloroplatinic acid was then added to the solution. The mixture was stirred at 350 rpm using the overhead stirrer. 10 g of bisphenol A bisallyl ether was diluted with 40 mL toluene and placed in the addition funnel. The diluted bisphenol bisallyl ether was added dropwise to the mixture at a rate of 2 drops/minute under stirring over 10 hours. The reaction mixture was stirred for another 6 hours at 80° C. 1H NMR spectrum indicated the disappearance of alkene peaks between 5-6.5 ppm. 3 g charcoal was then added to the mixture and stirred at 80° C. for 30 min. The solution was filtered through Buchner funnel with Whatmann filter paper packed with 3 g of celite using a water aspirator. The toluene was distilled from the filtrate in a rotovap at 90° C. under vacuum of 20 mbar. A light yellowish liquid product was obtained. Both NMR and FTIR spectra confirmed the OSC-1 structure.

Chemical structure of a representative DAC (DAC-1) is illustrated below.

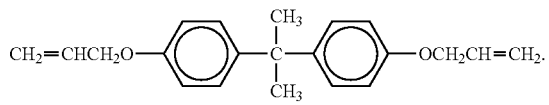

Silicone oil with pendent alkyl chain of formula

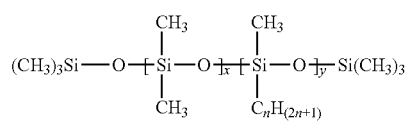

is employed as the bleeding additive.

Examples 1-5 and Comparative Examples 1-6

A silicone rubber base compound was prepared according to the state of the art in a mixer containing two sets of knitting agitators from 20 parts of dimethylvinylsilyl-terminated polydimethylsiloxane having a viscosity of 10 Pa·s (Silopren* U10 from Momentive Performance Materials) and 20 parts of dimethylvinylsilyl-terminated polydimethylsiloxane having a viscosity of 65 Pa·s (Silopren* U65), 4.3 parts of hexamethyldisilazane, 0.43 parts of divinyltetramethyldisilazane, 21 parts of fumed silica having a Brunauer-Emmett-Teller (BET) specific surface area of 300 m$^2$/g (Aerosil® 300 from Evonik) and water, by first mixing at 100° C., then stripping to 150° C. under vacuum (<80 mbar) to achieve an uniformly mixed material. The mixture was then cooled and diluted with 16 parts of Silopren* U65 and 8 parts of Silopren* U10 to produce ca. 87.5 parts of silicone base compound.

The silicone base compound was further mixed with other components listed in Table 1 to prepare various silicone rubber formulations (parts and figures refer to weight or weight parts per hundred (pph)). Silopren* V5000 is dimethylvinylsiloxy-terminated poly(dimethylsiloxane-co-methylvinylsiloxane) having a vinyl content of 0.85 mmol/g and a viscosity of 5 Pa·s. Silopren* V200 is dimethylvinylsiloxy-terminated poly(dimethylsiloxane-co-methylvinylsiloxane) having a vinyl content of 2.1 mmol/g and a viscosity of 0.2 Pa·s. The SiH-crosslinker is a trimethylsilyl-terminated poly(dimethylsiloxane-co-methylhydrogensiloxane) with a SiH content of 7.3 mmol/g and a viscosity of 0.04 Pa·s. The SiH-extender is a dimethylhydrogensilyl-terminated polydimethylsiloxane with a SiH content of 1.4 mmol/g and a viscosity of 0.015 Pa·s. ECH is the inhibitor ethynyl cyclohexanol. OSC-1 is the organosilicon compound of the formula as shown above and contains ca. 7.2 mmol/g SiH. DAC-1 is the aromatic diallyl compound of the formula shown above and contains ca. 6.5 mmol/g vinyl group. Alkyl oil-1 is the formula shown above with x=20, y=5 and n=12-14, and alkyl oil-2 has x=0, y=4 and n=10. The molar percentage of non-silicon-bound carbon to all carbons is about 52% in alkyl oil-1 and about 72% in alkyl oil-2. Phenyl oil has a formula of $MD_3D^{Ph2}{}_2M$, wherein $D^{Ph2}=(C_6H_5)_2SiO_{2/2}$. Fluoro oil has a formula of MD 25M, wherein $D^F=CH_3(CF_3CH_2CH_2)SiO_{2/2}$. The Pt catalyst was added last when all the other ingredients had been mixed. The molar ratio of all SiH to all vinyl groups (in both SiVi and DAC (there contained in the allyl group) in the composition in the examples was controlled in the range of 1.2-2.5.

Each rubber formulation was applied to a thickness of ca. 1 mm between a thermoplastic bar and an aluminum (Al) metal bar and then placed in a 120° C. oven for 10 min to cure. Thermoplastic substrates include Lexan™ 121 PC (supplied from SABIC) and Valox 420 PBT (supplied from SABIC). The sandwiched assembly was then pried open in the oven right after vulcanization, to test for adhesion to Al. The cured silicone layer was further tested for adhesion to thermoplastic substrates. If the rubber could be peeled off from either the PC substrate or the PBT substrate at 120° C., it is then regarded as failing the adhesion test to PC or PBT, respectively. Each formulation was tested at least six times, and the success rate (in %) of adhesion to each substrate at 120° C. was illustrated in Table 1 (>90%=no adhesion failure). The sandwiched assembly was also cooled down to room temperature (ca. 23° C.) and then dissembled with force at room temperature. The success rate (in %) of adhesion to each substrate at ca. 23° C. was also illustrated in Table 1 (>90%=no adhesion failure), with a sample size of at least six for each formulation.

For a rubber sample that has no adhesion to PC at 120° C., it would be considered not applicable for multicomponent molding processes, as the cured silicone rubber is likely delaminated from the PC substrate during the demolding step at 120° C., yielding a defect in production. Lack of bonding to metal substrates at 120° C., on the other hand, is desired for multicomponent molding processes, as the rubber sample needs to be completely demolded from metal mold during the process.

The cured silicone samples were examined for blooming immediately after vulcanization. They were then allowed to stay at room temperature for four hours and then examined for oil bleed property. Dynamic coefficient of friction (COF) of each sample was determined on a SP-101 Slip/Peel Tester (Instrumentor, Inc.) using a method adapted from ASTM D-1894.

Formulation of a regular self-bonding silicone rubber without oil-bleed property is illustrated in comparative example 1. Incorporating additional 3 wt % of phenyl silicone oil in the formulation demolished its bonding performance (comparative example 2). When alkyl oil-1 or alkyl oil-2 is employed instead of the phenyl oil, adhesion properties were retained while the samples exhibited decent oil-bleed property, as shown in examples 1 and 4. Further increasing the loading level of alkyl oil from 3 wt % to as high as 12 wt %, the bonding performance was largely retained (examples 2, 3, and 5), though alkyl oil-1 performed slightly better than alkyl oil-2 in terms of adhesion (example 3 versus example 5). Alkyl oil-1 has less non-silicon-bound carbon than alkyl oil-2.

When fluoro silicone oil was incorporated in the rubber formulations (comparative examples 3 and 4), though the bonding performance was preserved, the samples didn't appear to give any obvious oil-bleed property.

When aromatic DAC was removed from the rubber formulations, as shown in comparative example 5 versus example 1 and comparative example 6 versus example 4, the adhesion property vanished. The aromatic DAC is needed, together with OSC-1, in the rubber formulation to generate adequate bonding to thermoplastics.

Table 1 shows the compositions tested and the test results.

TABLE 1

|  | Examples ||||| Comparative examples ||||||
| --- | --- | --- | --- | --- | --- | --- | --- | --- | --- | --- | --- |
|  | 1 | 2 | 3 | 4 | 5 | 1 | 2 | 3 | 4 | 5 | 6 |
| Composition in pph |||||||||||||
| Silicone base compound | 87.50 | 87.50 | 87.50 | 87.50 | 87.50 | 87.50 | 87.50 | 87.50 | 87.50 | 87.50 | 87.50 |
| Silopren* U65 |  |  |  |  |  |  |  |  |  | 0.25 | 0.25 |
| Silopren* V5000 | 5.75 | 5.75 | 5.75 | 5.75 | 5.75 | 5.75 | 5.75 | 5.75 | 5.75 | 5.75 | 5.75 |
| Silopren* V200 | 0.70 | 0.70 | 0.70 | 0.70 | 0.70 | 0.70 | 0.70 | 0.70 | 0.70 | 0.70 | 0.70 |
| H-crosslinker | 1.65 | 1.65 | 1.65 | 1.65 | 1.65 | 1.65 | 1.65 | 1.65 | 1.65 | 1.65 | 1.65 |
| H-extender | 2.90 | 2.90 | 2.90 | 2.90 | 2.90 | 2.90 | 2.90 | 2.90 | 2.90 | 2.90 | 2.90 |
| ECH | 0.04 | 0.04 | 0.04 | 0.04 | 0.04 | 0.04 | 0.04 | 0.04 | 0.04 | 0.04 | 0.04 |

TABLE 1-continued

| | Examples | | | | | Comparative examples | | | | | |
|---|---|---|---|---|---|---|---|---|---|---|---|
| | 1 | 2 | 3 | 4 | 5 | 1 | 2 | 3 | 4 | 5 | 6 |
| OSC-1 | 1.20 | 1.20 | 1.20 | 1.20 | 1.20 | 1.20 | 1.20 | 1.20 | 1.20 | 1.20 | 1.20 |
| DAC-1 | 0.25 | 0.25 | 0.25 | 0.25 | 0.25 | 0.25 | 0.25 | 0.25 | 0.25 | | |
| Alkyl oil-1 | 3.10 | 6.40 | 13.60 | | | | | | | 3.10 | |
| Alkyl oil-2 | | | | 3.10 | 13.60 | | | | | | |
| Phenyl oil | | | | | | | 3.10 | | | | |
| Fluoro oil | | | | | | | | | 3.10 | 13.6 | 3.10 |
| Karstedt Pt (10 wt % Pt) | 0.01 | 0.01 | 0.01 | 0.01 | 0.01 | 0.01 | 0.01 | 0.01 | 0.01 | 0.01 | 0.01 |
| Parts of components D or E or F per 100 parts of component A | | | | | | | | | | | |
| Component D | 1.56 | 1.56 | 1.56 | 1.56 | 1.56 | 1.56 | 1.56 | 1.56 | 1.56 | 1.56 | 1.56 |
| Component E | 0.33 | 0.33 | 0.33 | 0.33 | 0.33 | 0.33 | 0.33 | 0.33 | 0.33 | 0.00 | 0.00 |
| Component F | 4.03 | 8.32 | 17.69 | 4.03 | 17.69 | 0.00 | 4.03 | 4.03 | 17.69 | 4.02 | 4.02 |
| Adhesion success rate in % | | | | | | | | | | | |
| Adhesion to PC at 120° C. | >90% | >90% | 80% | >90% | 50% | >90% | 0% | >90% | >90% | 0% | 0% |
| Adhesion to PBT at 120° C. | >90% | >90% | >90% | >90% | >90% | >90% | 0% | >90% | >90% | 0% | 0% |
| Adhesion to Al at 120° C. | 0% | 0% | 0% | 0% | 0% | 0% | 0% | 0% | 0% | 0% | 0% |
| Adhesion to PC at 23° C. | >90% | >90% | >90% | >90% | >90% | >90% | 0% | >90% | >90% | 0% | 0% |
| Adhesion to PBT at 23° C. | >90% | >90% | >90% | >90% | >90% | >90% | 0% | >90% | >90% | 0% | 0% |
| Adhesion to Al at 23° C. | 0% | 0% | 0% | 0% | 0% | 0% | 0% | 0% | 0% | 0% | 0% |
| Oil-bleed performance | | | | | | | | | | | |
| Oil-bleed immediately after molding | no | no | no | no | no | no | no | no | no | no | no |
| Oil-bleed observation in 4 h | yes | yes | yes | yes | yes | no | yes | no | no | yes | no |
| Dynamic coefficient of friction | 0.36 | 0.38 | 0.35 | 0.26 | 0.34 | 0.58 | 0.25 | 0.60 | 0.62 | 0.28 | 0.59 |

The invention claimed is:

1. Addition-curable silicone rubber composition, comprising:
   (A) at least one polyorganosiloxane having at least two unsaturated hydrocarbyl residues,
   (B) at least one polyorganohydrogensiloxane,
   (C) at least one hydrosilylation catalyst, comprising a transition metal,
   (D) at least one organosilicon compound containing at least one polyvalent aromatic group, which is not directly attached to a silicon atom, and at least one Si—H group, different from compound B),
   (E) at least one aromatic compound with at least two unsaturated hydrocarbyl groups, which aromatic compound does not contain a siloxane group,
   (F) at least one silicone oil having at least one alkyl group having at least two carbon atoms and not having any aromatic groups,
   (G) optionally one or more reinforcing fillers, and
   (H) optionally one or more auxiliary additives.

2. Addition-curable silicone rubber composition, according to claim 1, wherein component (A) is selected from one or more polyorganosiloxanes of the general formula (1):

$$[M_a D_b T_c Q_d Z_e]_m \qquad (1)$$

wherein
a=0-10
b=0-2000,
c=0-50
d=0-10
e=0-300
m=1-1000, with
a+b+c+d+e≥2, and
$M=R_3SiO_{1/2}$, or $M^*$
$D=R_2SiO_{2/2}$, or $D^*$
$T=RSiO_{3/2}$, or $T^*$
$Q=SiO_{4/2}$,
Z is a divalent optionally substituted hydrocarbyl bridging group with up to 14 carbon atoms between two siloxy groups,
wherein R is selected from optionally substituted hydrocarbyl groups with up to 30 carbon atoms and poly($C_2$-$C_4$)-alkylene ether groups with up to 1000 alkylene oxy units, the groups R being free of aliphatic unsaturation, and wherein
$M^*=R^1_p R_{3-p}SiO_{1/2}$,
$D^*=R^1_q R_{2-q}SiO_{2/2}$,
$T^*=R^1 SiO_{3/2}$,
wherein
p=1-3,
q=1-2, and
$R^1$ is selected from unsaturated optionally substituted hydrocarbyl groups with up to 30 carbon atoms,
with the proviso that there are at least two groups selected from M*, D* and T*.

3. Addition-curable silicone rubber composition, according to claim 1, wherein component (B) is selected from one or more polyorganohydrogensiloxanes of the general formula (2):

$$[M^1_{a2} D^1_{b2} T^1_{c2} Q_{d2} Z_{e2}]_{m2} \qquad (2)$$

wherein the siloxy units
$M^1$=M, as defined above, or M**,
$D^1$=D, as defined above, or D**,
$T^1$=T, as defined above, or T**,
Q as defined above,
Z as defined above,
$M^{}=HR_2SiO_{1/2}$, $D^{}=HRSiO_{2/2}$, $T^{**}=HSiO_{3/2}$,
a2=0.01-10 2
b2=0-1000 c2=0-50
d2=0-5
m2=1-1000, with the proviso that there are at least two groups selected from M, D and T**.

4. Addition-curable silicone rubber composition, according to claim 1, wherein component (C) is selected from hydrosilylation catalysts comprising platinum.

5. Addition-curable silicone rubber composition, according to claim 1, wherein component (D) is an organosilicon compound comprising one or more straight-chain or cyclic optionally substituted organosiloxane moieties containing 1 to 30 silicon atoms, at least one Si—H group, and at least one polyvalent aromatic group, which is not directly attached to a silicon atom.

6. Addition-curable silicone rubber composition, according to claim 1, wherein the compound (E) is selected from the group consisting of an aromatic compound of the formula (3):

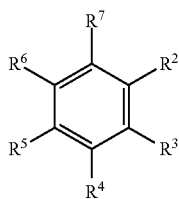

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 6 carbon atoms, —O—$R^9$, wherein $R^9$ is a saturated or unsaturated optionally substituted hydrocarbyl group with up to 6 carbon atoms, —C(O)—O—$R^{10}$, wherein $R^{10}$ is a saturated or unsaturated optionally substituted hydrocarbyl group with up to 6 carbon atoms, and —O—C(O)—$R^{10}$ wherein $R^{10}$ is as defined before, with the proviso that the compound of formula (3) comprises at least two unsaturated hydrocarbyl groups, and an aromatic compound of the formula (4):

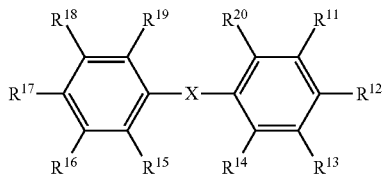

(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up to 20 carbon atoms, —O—$R^{22}$, wherein $R^{22}$ is a saturated or unsaturated optionally substituted hydrocarbyl group with up to 20 carbon atoms, —C(O)—O—$R^{23}$, wherein $R^{23}$ is a saturated or unsaturated optionally substituted hydrocarbyl group with up to 20 carbon atoms, —O—C(O)—$R^{23}$, wherein $R^{23}$ is as defined before, and a silyloxy group of the formula —OSi$R^{24}R^{25}R^{26}$, wherein $R^{24}$, $R^{25}$, and $R^{26}$ are independent from each other selected from optionally substituted hydrocarbyl group with up to 20 carbon atoms, X is selected from the group consisting of the groups: single bond, —$R^{27}$—, wherein $R^{27}$ is a divalent linear or cyclic saturated optionally substituted hydrocarbyl group with up to 20 carbon atoms, —C(O)—,
—S(O)$_2$—,
—S(O)—,
—S—
—O—Si($R^{28}$)$_2$—O—, wherein $R^{28}$ is independently selected from the group of a halogen, and a saturated or unsaturated hydrocarbyl group with up to 6 carbon atoms, and
—O—
with the proviso that the compound of formula (4) comprises at least two unsaturated hydrocarbyl groups.

7. Addition-curable silicone rubber composition according to claim 1,
wherein component (F) satisfies one or more of the following features:
Component (F) does not have halogen atoms,
Component (F) has at least one alkyl groups having at least two carbon atoms, wherein said alkyl group is selected from the group consisting of pendent and terminal alkyl groups,
Component (F) is a linear polydimethylsiloxane wherein at least one methyl group is replaced by an alkyl group having at least two carbon atoms, wherein said alkyl group is selected from the group consisting of pendent and terminal alkyl groups,
Component (F) has at least one two alkyl group having at least two carbon atoms having 3 to 20 carbon atoms,
Component (F) has terminal trimethylsiloxy-groups, and
Component (F) has a molar percentage of non-silicon-bound carbon to all carbons in a range of 30 mol-% to 95 mol-%.

8. Addition-curable silicone rubber composition according to claim 1, wherein component (F) has the formula (5):

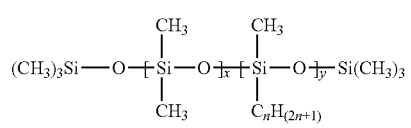

(5)

wherein n is ≥2, and x is 0 to 50, and y is 1 to 50.

9. Addition-curable silicone rubber composition according to claim 1, wherein component (G) is selected from reinforcing fillers having a BET surface area of 50 m²/g or more.

10. Addition-curable silicone rubber composition according to claim 1, wherein component (H) is selected from the group consisting of one or more of the following components: an inhibitor; a plasticizer or softener, non-reinforcing fillers, and fiber materials.

11. Addition-curable silicone rubber composition according to claim 1, comprising:
100 parts by weight of component (A),
0.01 to 100 parts by weight of component (B)
0.5 to 1000 ppm of component (C) based on the weight amount of the transition metal and based on the total weight of components (A) and (B),
0.05 to 10 parts by weight of component (D)
0.01 to 10 parts by weight of component (E),
0.01 to 40 parts by weight of component (F),
0 to 100 parts by weight of component (G), and
0 to 100 parts by weight of component (H).

12. A cured silicone rubber composition, obtained by curing the addition-curable silicone rubber composition as defined in claim 1.

13. A composite material, comprising a substrate and the cured silicone rubber composition as defined in claim 12 on the surface of such substrate, said substrate is selected from the group consisting of acrylonitrile-butadiene-styrene resins, styrene resins, polyethylene resins, polypropylene resins, polyacetal resins, acrylic resins, polyethylene terephthalate, polybutylene terephthalate, polyphenylene sulfide resins, polyimide resins, polycarbonate, polyester, polyurethane, poly(phenylene oxide), polysulfone, polyvinylalcohol, phenolic resin, epoxy resin, polyamide, polyetherimide, cellulose, glass, and mixtures thereof.

14. A method of manufacturing a composite material according to claim 13, wherein a substrate that contains residual hydrosilyl-reaction groups, is coated with the addition-curable silicone rubber composition and thereafter the addition-curable silicone rubber composition is cured on the surface of said substrate, wherein the substrate is a thermoplastic resin, and wherein the method comprises the molding of the thermoplastic resin and thereafter the addition-curable silicone rubber composition is over-molded onto the thermoplastic part in the same molding equipment and cured.

15. An article comprising the addition-curable silicone rubber composition of claim 1, or a composite material comprising the addition-curable silicone rubber of claim 1 disposed on a surface of a substrate, wherein the article is selected from mobile phone cases, mobile gaskets, safety masks, intravenous access devices, electronic accessories, aerospace articles or devices, packagings, automotive parts, waterproof articles, integrated articles with slip surfaces to improve mounting efficiency during the assembly of devices, coated articles for seals, automotive parts, keyboards, food packagings, coffee capsules, closing or dosing caps, closing or metering valves, food containers, kitchen appliances diving masks, face masks, teethers, baby suckers, furnitures, shelves, textiles, shoes, sports and recreational equipment, watch straps, medical devices, tubes or valves optionally with integrated flange elements, or tubes with integrated pipe bends.

\* \* \* \* \*